US009538092B2

(12) United States Patent
Mody et al.

(10) Patent No.: US 9,538,092 B2
(45) Date of Patent: Jan. 3, 2017

(54) METHODS AND APPARATUS TO GENERATE WIDE DYNAMIC RANGE IMAGES

(71) Applicant: TEXAS INSTRUMENTS INCORPORATED, Dallas, TX (US)

(72) Inventors: Mihir Narendra Mody, Bangalore (IN); Niraj Nandan, Bangalore (IN); Hetul Sanghavi, Bangalore (IN); Rajsekhar Allu, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 44 days.

(21) Appl. No.: 14/599,201

(22) Filed: Jan. 16, 2015

(65) Prior Publication Data

US 2015/0207974 A1    Jul. 23, 2015

(30) Foreign Application Priority Data

Jan. 17, 2014  (IN) .............................. 200/CHE/2014

(51) Int. Cl.
| | |
|---|---|
| *H04N 9/73* | (2006.01) |
| *H04N 5/235* | (2006.01) |
| *H04N 5/355* | (2011.01) |
| *H04N 5/345* | (2011.01) |

(52) U.S. Cl.
CPC ............ *H04N 5/2355* (2013.01); *H04N 5/345* (2013.01); *H04N 5/35581* (2013.01)

(58) Field of Classification Search
CPC ... H04N 5/2355; H04N 5/345; H04N 5/35581
USPC ........................... 348/223.1–229.1, 362–365
See application file for complete search history.

(56) References Cited

U.S. PATENT DOCUMENTS

2005/0099509 A1* 5/2005 Kobayashi ............. H04N 5/235
                                                                  348/229.1

OTHER PUBLICATIONS

Salih et al., "Tone Mapping of HDR Images: A Review," Jun. 12-14, 2012, 4th International Conference on Intelligent and Advanced Systems, Centre for Intelligent Signal and Imaging Research (CISIR), Universiti Teknologi Petronas, Malaysia, 6 pages.

(Continued)

*Primary Examiner* — Yogesh Aggarwal
(74) *Attorney, Agent, or Firm* — Lawrence J. Bassuk; Charles A. Brill; Frank D. Cimino

(57) ABSTRACT

Methods and apparatus to generate wide dynamic range images are disclosed. An example apparatus includes a first processing block having first input, second input to receive input data from an image sensor, and first output; a second processing block having third input, fourth input to receive input data from the image sensor, and second output, at least one of the first and second outputs to output a WDR image based on at least two of the first, second, third and fourth inputs; an architecture recognizer having fifth input and third output, the third output to convey an architecture type of the image sensor; a function selector having fourth output to identify at least one of the first and second processing blocks based on the third output; and a sensor adapter having seventh input coupled to the fourth output and having fifth output coupled to the first and third inputs.

26 Claims, 20 Drawing Sheets

(56) References Cited

OTHER PUBLICATIONS

Kavusi et al., "Architectures for High Dynamic Range, High Speed Image Sensor Readout Circuits," Oct. 16-18, 2006, Department of Electrical Engineering, Stanford University, Stanford CA, 6 pages.
Huang et al., "Image Pipeline Algorithms for Standard Mobile Imaging Architecture Sensors," Aug. 21-23, 2005, 18th IPPR Conference on Computer Vision, Graphics and Image Processing, Department of Computer Science and Information Engineering National Taiwan University, Taipei, Taiwan, 8 pages.
Fowler, "High Dynamic Range Image Sensor Architectures," Jan. 24, 2011, Proc. SPIE. 7876, Digital Photography VII, 787602, 15 pages.

* cited by examiner

US 9,538,092 B2

METHODS AND APPARATUS TO GENERATE WIDE DYNAMIC RANGE IMAGES

RELATED APPLICATION

This patent claims priority to Indian Provisional Patent Application Serial No. 200/CHE/2014, filed Jan. 17, 2014. The entirety of Indian Provisional Patent Application Serial No. 200/CHE/2014 is incorporated herein by reference.

FIELD OF THE DISCLOSURE

This disclosure relates generally to image processing and, more particularly, to methods and apparatus to generate wide dynamic range images.

BACKGROUND

Wide Dynamic Range (WDR) imaging techniques enable capturing photographs with high light variations (e.g., >60 dB) within a given image. Typically, imaging sensor manufacturers support WDR using proprietary image processing techniques relating to actual physical capture techniques and/or transmission format methodologies.

BRIEF DESCRIPTION OF THE DRAWINGS

The figures are not to scale. Wherever appropriate, the same reference numbers will be used throughout the drawing(s) and accompanying written description to refer to the same or like parts.

DETAILED DESCRIPTION

Figure 1:
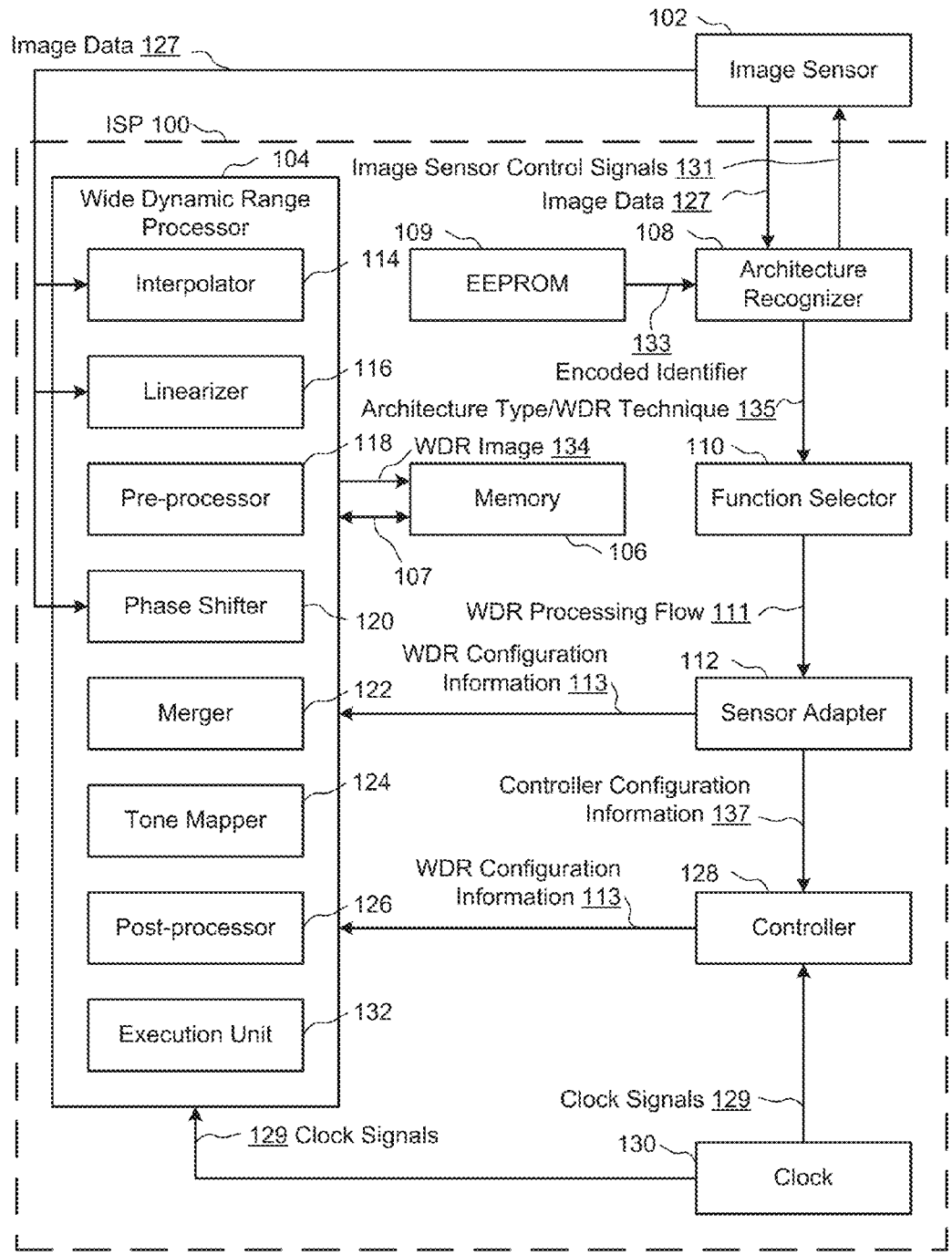
FIG. 1 is a block diagram of an example image signal processor constructed in accordance with the teachings of this disclosure to generate wide dynamic range images.

Known image sensors include 2-D arrays of pixels. Each pixel of such a sensor contains a photo-detector that converts light into photocurrent. Since photocurrent is very small (e.g., typically on the order of femtoamperes (fA), or $10^{-15}$ Amperes), reading photocurrent directly is difficult. Known image sensors, such as charge-coupled devices (CCDs)

and/or complementary metal-oxide-semiconductor (CMOS) devices, operate in direct integration mode in which photo-current is integrated into charge throughout the duration of an exposure. The accumulated charge is then measured as a voltage.

Known image signal processors (ISPs) implement one or more algorithms to process image data captured from an image sensor. Known image sensors (CCD/CMOS) capture images in Bayer format, with N bits per channel (e.g. 12 bits-per-channel, or 12 bits used to represent the color value of a pixel). Known image sensor processors include algorithms such as noise filtering, color processing, and/or color conversion to enable the image sensor processor to pass the processed image data to a next stage of processing (e.g., analytics, display, and/or compression).

As used herein, dynamic range is defined to be a measurement which quantifies the ability of an image sensor to adequately capture both the brightest and darkest points in a scene. Specifically, dynamic range (DR) is defined to be the ratio of the largest non-saturating input signal ($i_{max}$) to the smallest detectable input signal ($i_{min}$). In some examples, dynamic range calculated may be calculated as shown in equation (1).

$$DR = 20\ \log_{10}(i_{max}/i_{min}) \quad \text{Equation (1)}$$

Example dynamic ranges include: around 100 decibels (dB) in the typical human eye; 60 dB in a typical 10 bit image sensor used in known mobile devices; 72 dB in a higher-end 12 bit image sensor used in known mobile devices; and 96 dB in a native 16 bit wide dynamic range sensor.

To increase the dynamic range of an image sensor, the image sensor may be modified and/or operated to increase the largest non-saturating input signal ($i_{max}$) and/or to decrease the smallest detectable input signal ($i_{min}$) to increase the ratio in equation (1) above. Increasing the dynamic range of an image sensor often requires modifying pixel integration times (i.e., the time it takes to accumulate the charge to be measured during an exposure) depending on actual illumination. Modifying pixel integration times may include using short integration times (and/or low sensitivity) to obtain pixels with high illumination and/or using long integration times (and/or high sensitivity) to obtain pixels with low illumination. However, using excessively long integration times causes motion blur in video capture. In practice, there are several techniques proposed to extend dynamic range. These techniques are referred to as Wide Dynamic Range (WDR) or High Dynamic Range (HDR). WDR and HDR are used interchangeably in this specification. For ease of reference, WDR is used herein to collectively refer to any techniques that may be classified as WDR and/or HDR.

Example methods and apparatus disclosed herein provide a flexible image signal processor that is capable of adapting to any of a variety of WDR image capture techniques used by image sensors. To this end, example methods and apparatus disclosed herein include in an image signal processor a set of WDR processing blocks that may be individually selected, omitted, and/or re-used to perform appropriate image processing for any of multiple different WDR techniques that may be used as inputs to the image signal processor.

Example methods and apparatus disclosed herein provide dynamic, configurable basic processing blocks (e.g., circuits and/or software) that may be configured and/or controlled to accomplish WDR processing for any of multiple WDR techniques and/or architectures. In some examples disclosed herein, phase-shifting and/or checkerboard interpolation are separate, defined processing blocks to support line-interleaved WDR techniques and/or single frame checkerboard WDR techniques. In some such examples, the phase shifting block and/or the checkerboard interpolation block also streamline processing data paths for sets of WDR processing blocks. Some example methods and apparatus disclosed herein use tone mapping to enable support for lower bit-per-channel image signal processors. Using tone mapping enables the use of legacy ISP pipelines (e.g., by not requiring changes to image signal processing algorithms to process 16 bit-per-channel images).

Example methods disclosed herein configure an image signal processor to process image data. Some such disclosed example methods involve determining an architecture type of an image sensor, selecting a subset of wide dynamic range processing blocks of an image signal processor to execute a wide dynamic range processing flow based on the architecture type of the image sensor, and configuring the subset of the wide dynamic range processing blocks to generate a wide dynamic range image from input data from the image sensor.

Example apparatus disclosed herein include a first wide dynamic range processing block, a second wide dynamic range processing block, an architecture recognizer, a function selector, and a sensor adapter. In the disclosed example apparatus, the first wide dynamic range processing block has a first input, a second input to receive input data from an image sensor, and a first output. In the disclosed example apparatus, the second wide dynamic range processing block has a third input, a fourth input to receive input data from the image sensor, and a second output, at least one of the first and second outputs to output a wide dynamic range image based on at least two of the first, second, third and fourth inputs. In the disclosed example apparatus, the architecture recognizer has a fifth input and a third output, the third output to convey an architecture type of the image sensor. In the disclosed example apparatus, the function selector has a sixth input coupled to the third output of the architecture recognizer. In the disclosed example apparatus, the function selector also has a fourth output to identify at least one of the first and second wide dynamic range processing blocks based on the third output. In the disclosed example apparatus, the sensor adapter has a seventh input coupled to the fourth output of the function selector. In the disclosed example apparatus, the sensor adapter has a fifth output coupled to the first input of the first wide dynamic range processing block and to the second input of the second wide dynamic range processing block.

Example apparatus disclosed herein include an architecture recognizer, a function selector, and a sensor adapter. In disclosed example apparatus, the architecture recognizer determines an architecture type of an image sensor. In disclosed example apparatus, the function selector selects a subset of wide dynamic range processing blocks of an image signal processor to execute a wide dynamic range processing flow based on the architecture type of the image sensor. In disclosed example apparatus, the sensor adapter configures the subset of the wide dynamic range processing blocks to generate a wide dynamic range image from input data from the image sensor.

FIG. 1 is a block diagram of an example image signal processor 100 constructed in accordance with the teachings of this disclosure to generate wide dynamic range images. The example ISP 100 of FIG. 1 is connected to an image sensor 102. The image sensor 102 may use any WDR technique to output WDR images. The example ISP 100 of FIG. 1 includes a WDR processor 104, a memory 106, an architecture recognizer 108, a function selector 110, and a sensor adapter 112.

The example image sensor 102 of FIG. 1 may be implemented by any type of image sensor from which WDR images can be obtained or generated using WDR techniques.

There are multiple WDR techniques relating to using multiple samples, captures, or exposures. Three sub-categories of multiple-sample techniques are based on multiplexing (e.g., diversity) in time, space, or both.

In some examples, the image sensor 102 implements multiple-sampling with time diversity by reading the entire frame of pixels from the image sensor multiple times, with different exposure ratios for different frames and combining the results. For example, multiple-sampling with time diversity may include capturing a first frame using a longer-time exposure, followed by capturing a second frame using a shorter-time exposure and combining the results.

Figure 2:
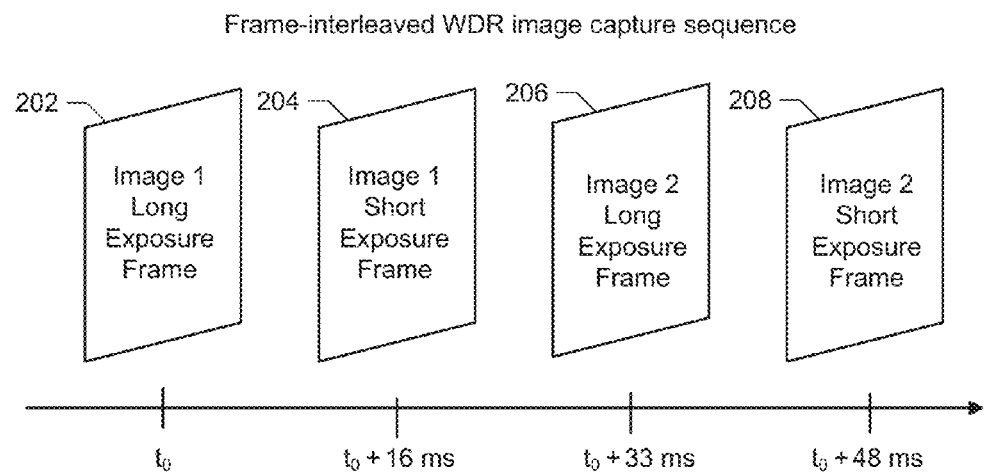
FIG. 2 illustrates an example sequence of frames captured by an image sensor to perform frame-interleaved WDR.

Multiple-sampling with time diversity is also referred to herein as frame-interleaved WDR. In case of two exposures, multiple-sampling with time diversity is also known as a dual exposure WDR technique. FIG. 2 illustrates an example sequence of frames captured by an image sensor to perform frame-interleaved WDR. As shown in FIG. 2, a first WDR image is constructed by capturing a long exposure frame 202 at a first time $t_0$, followed by capturing a short exposure frame 204 at a second time $t_0+16$ ms. As described in more detail below, the long exposure frame 202 and the short exposure frame 204 are processed to generate a resulting WDR image. Similarly, a second WDR image is subsequently constructed by capturing a long exposure frame 206 at a third time $t_0+33$ ms, followed by capturing a short exposure frame 208 at a second time $t_0+48$ ms.

The frame-interleaved WDR technique results in no specific change in image sensor hardware, which makes this technique inexpensive to implement. However, multiple-sampling with time diversity results in a loss of temporal resolution (e.g., a loss factor of 2 for two exposures). The sensor needs to run twice as fast for dual exposure WDR than in a single image capture mode (e.g., WDR requires capture of 60 frames per second to output images at 30 frames per second). Another drawback of this approach is the introduction of motion blur artifacts from different exposure frames during merging of the frames (e.g., 2 frames are merged into one frame for dual exposure) to create a resulting WDR frame. This works well for many scenarios, but image quality can be compromised in capturing images with high motion content.

In some examples, the image sensor 102 implements multiple-sampling with spatial diversity by reading alternating lines of pixels with different exposure durations. In such an example, the first, third, and fifth lines of pixels are read at a first exposure level (e.g., a long exposure duration), while the second, fourth, and sixth lines of pixels are read at a second exposure level (e.g., a short exposure duration). In other examples, sets of two or more lines of pixels are alternated (e.g., the first and second lines and the fifth and sixth lines are read at the first exposure level, while the third and fourth lines and the seventh and eighth lines are read at the second exposure level).

Figure 3:
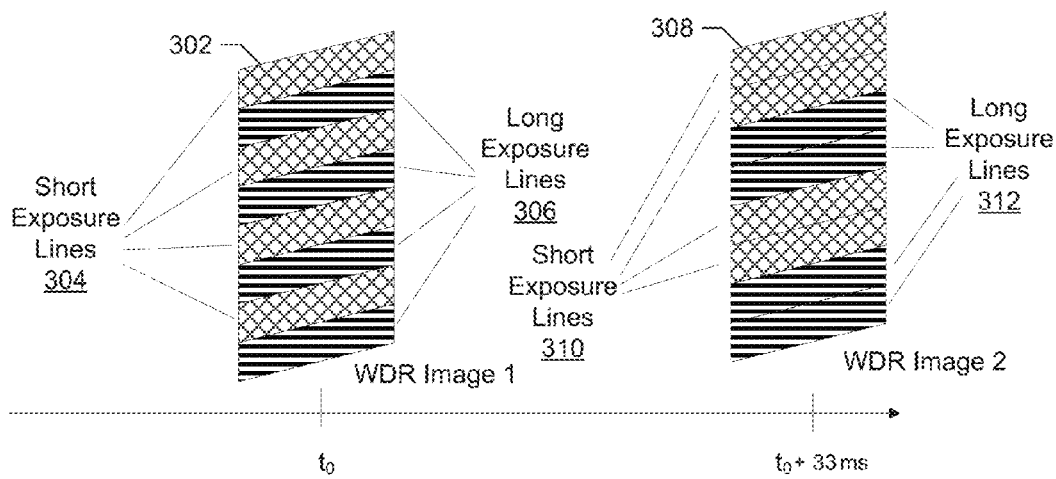
FIG. 3 illustrates example frames captured by an image sensor to perform line-interleaved WDR.

FIG. 3 illustrates example frames captured by an image sensor to perform line-interleaved WDR. FIG. 3 illustrates frames 302, 308 including multiple horizontal lines of pixels. A first frame 302 of FIG. 3 taken at a first time $t_0$ includes short exposure lines 304 interleaved with long exposure lines 306. The example short exposure lines 304 are read first at the conclusion of a short exposure period.

The example long exposure lines 306 are then read at the conclusion of the long exposure period. The short exposure period and the long exposure period may begin at the same time. A second frame 308 includes short exposure lines 310 and long exposure lines 312. In contrast to the first frame 302, the second frame 308 interleaves two (or more) of the short exposure lines 310 with two (or more) of the long exposure lines 312.

Multiple-sampling with spatial diversity is also referred to herein as line-interleaved WDR. Multiple-sampling with spatial diversity results in a loss of spatial resolution (e.g., a loss factor of 2 for two exposures). In multiple-sampling with spatial diversity, the ISP 100 performs phase shifting and vertical resizing by a factor of two to compensate for the loss of spatial resolution. However, multiple-sampling with spatial diversity results in fewer motion blur artifacts relative to multiple-sampling with temporal diversity.

Figure 4:
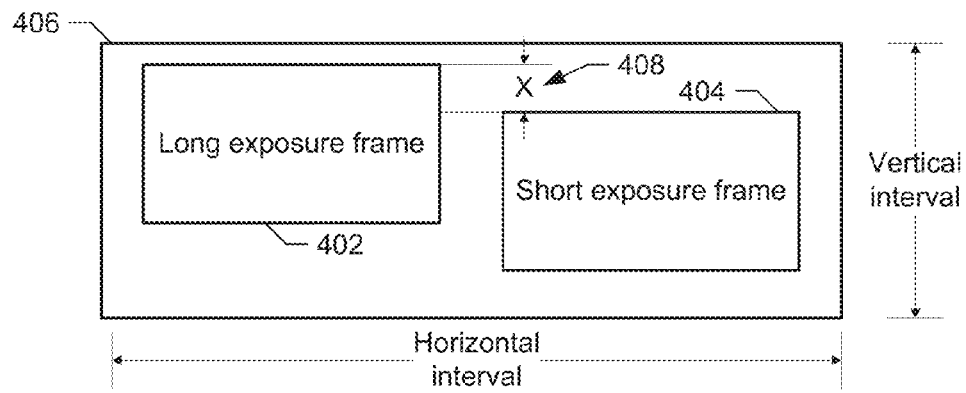
FIG. 4 illustrates example frames captured by an image sensor to perform multiple-sampling with both temporal and spatial diversity.

In some examples, the image sensor 102 implements multiple-sampling with both temporal and spatial diversity by performing captures of entire frames with exposures that differ in time and space. FIG. 4 illustrates example frames 402, 404 captured by an image sensor 406 to perform multiple-sampling with both temporal and spatial diversity. In the example of FIG. 4, a first frame 402 is captured with a long exposure duration on a first contiguous portion of the pixels of the image sensor 406 (e.g., long exposure frame). After a short offset 408 (e.g., X vertical lines or rows of pixels), a second frame 404 is then captured using a shorter exposure duration on a second contiguous portion of the pixels (e.g., short exposure frame). The first frame 402 (e.g., long exposure frame) may overlap with the second frame 404 (e.g., short exposure frame) in the vertical direction (e.g., use the same horizontal lines of pixels), but the first and second frames 402, 404 do not overlap in the horizontal direction. In other words, as shown in FIG. 4, the first and second contiguous portions may use different pixels from the same horizontal rows of pixels, but do not use any of the same pixels.

With multiple-sampling with both temporal and spatial diversity, the width of each resulting frame is twice the actual width of the image. Multiple-sampling with both temporal and spatial diversity has better spatial and temporal resolution with fewer motion blur artifacts than multiple-sampling with time diversity or spatial diversity. However, multiple-sampling with both temporal and spatial diversity requires more sophisticated hardware for the image sensor and more complicated processing in the ISP.

Figure 5:
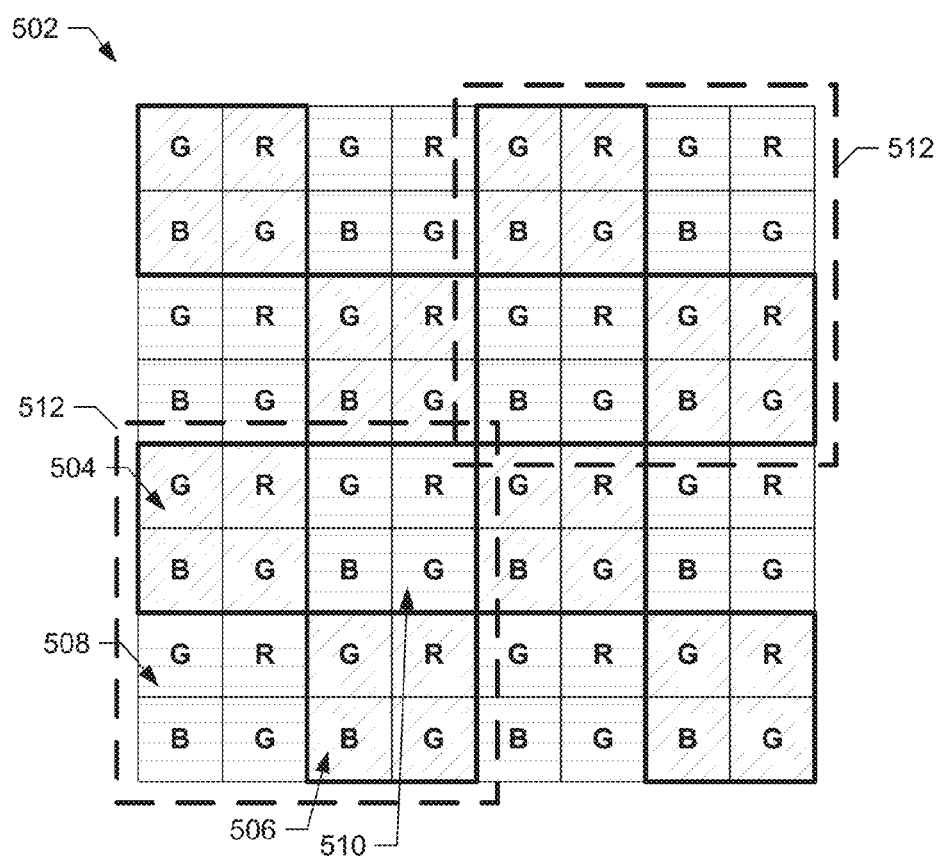
FIG. 5 illustrates an example pixel arrangement for an image sensor that implements single frame WDR with a checkerboard pattern.

In some examples, the image sensor 102 implements a single frame WDR with a checkerboard pattern, and has two different levels of sensitivity in the pixels of the image sensor 102. FIG. 5 illustrates an example pixel arrangement for an image sensor 502 that implements single frame WDR with a checkerboard pattern. The example image sensor 502 includes pixel blocks 504, 506, 508, 510 in a given 2×2 section 512, where each pixel block 504-510 is arranged in a Bayer pattern (e.g., 2 green pixels, 1 red pixel, and 1 blue pixel). The example pixel blocks 504, 506 have a first light sensitivity (e.g., low sensitivity) and the example pixel blocks 508, 510 have a second light sensitivity (e.g., high sensitivity).

The different sensitivities are arranged in a repeating checkerboard pattern. In the example of FIG. 5, the upper left and lower right pixel blocks 504, 506 have a low sensitivity, and the lower left and upper right pixel blocks 508, 510 have a higher sensitivity. The different pixel sensitivities provide the effect of dual exposure without actually changing exposure durations. As such, single frame WDR with a checkerboard pattern is also known as spatially-varying exposure. As shown in FIG. 5, the 2×2 pixel block section 512, and its corresponding sensitivity pattern, is repeated in adjacent sections throughout the image sensor 502.

The single frame WDR with checkerboard pattern technique has a better tradeoff between spatial and temporal resolution with lesser motion blur artifacts (e.g., relative to the multiple-frame WDR techniques described above), but requires more sophisticated processing to interpolate the resulting WDR image.

Figure 6:
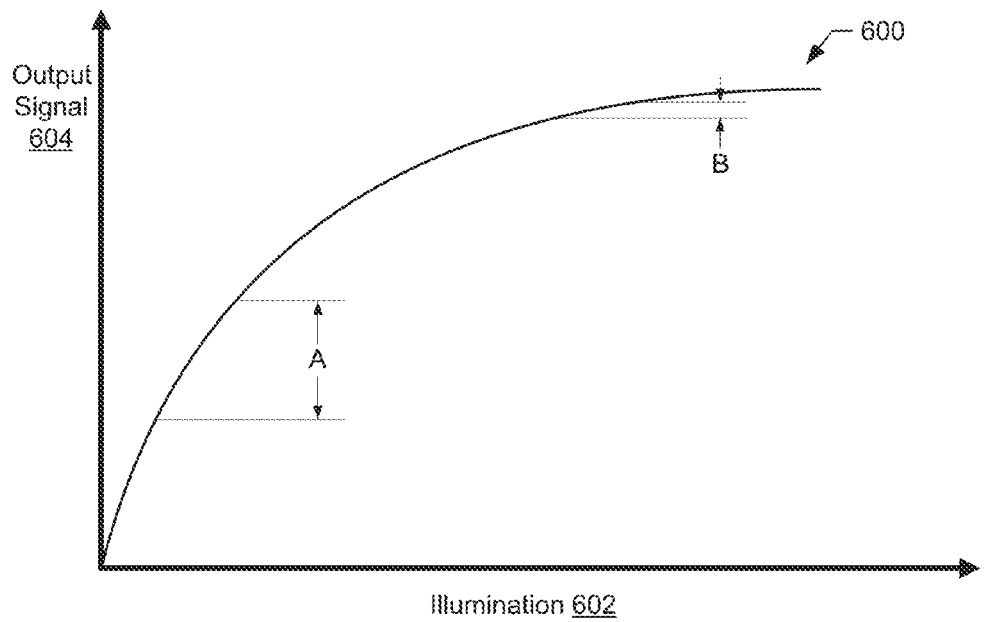
FIG. 6 illustrates an example relationship in a non-linear image sensor between illumination of a pixel by incident light and the corresponding output signal level of the pixel.

In some examples, the image sensor 102 has a non-linear light response, such as a logarithmic sensor (or compounding sensor) or a piecewise linear sensor (or multi-mode sensor). Non-linear image sensors require linearization correction before performing further processing. FIG. 6 illustrates an example relationship 600 in a non-linear image sensor between illumination 602 of a pixel by incident light and the corresponding output signal level 604 (e.g., voltage or charge) of the pixel. As shown in FIG. 6, there is a logarithmic relationship between the illumination 602 and the output signal level 604 such that, as the illumination of the pixel increases, the increase in the output signal level 604 (e.g., voltage or charge) is reduced per unit of increase in the illumination 602. For example, the difference A in the output level 604 at a lower illumination 602 is greater than the difference B in the output level 604 at a higher illumination 602 for the same unit change in illumination.

In some examples, the image sensor 102 is a native WDR sensor that provides output signals having a wide dynamic range, such as 16 bit-per-channel (also referred to herein as 16-bit) linear output signals. In some such examples, the image sensor 102 implements a time-to-saturate technique where, each time a given pixel saturates, a counter is incremented and the pixel is reset. The number of times the pixel saturates (as reflected by the count) during the exposure indicates the brightness of the pixel.

Figure 7:
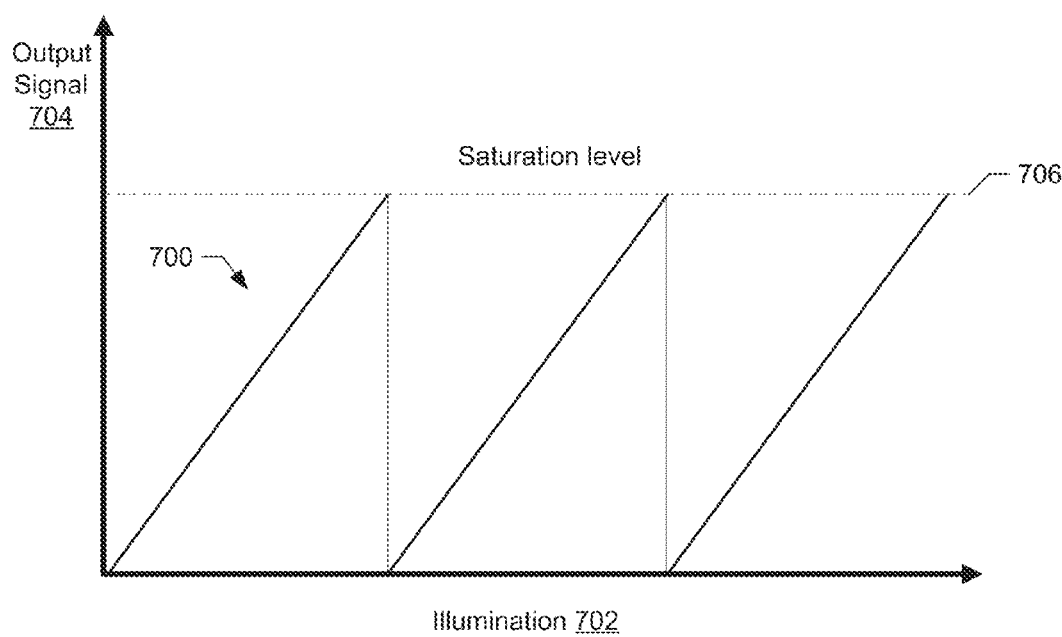
FIG. 7 illustrates an example relationship in a native WDR image sensor between illumination of a pixel by incident light and the corresponding output signal level of the pixel.

FIG. 7 illustrates an example relationship 700 in a native WDR image sensor between illumination 702 of a pixel by incident light and the corresponding output signal level 704 (e.g., voltage or charge) of the pixel. As the illumination 702 of the pixel increases (e.g., during an exposure of the pixel to a light source), the output level 704 increases until the output level 704 is equal to a saturation output level 706. When the output level 704 reaches saturation output level 706, the output signal 704 is reset and a counter is incremented. As the illumination 702 increases, the output signal 704 repeatedly reaches the saturation level, the output signal 704 is reset, and the counter is incremented. Thus, rather than measuring an output level of the pixel as a charge or voltage, the native WDR image sensor may determine the illumination of a pixel by determining a value of the counter for the exposure.

Known ISPs generally process 12 bit image data from image sensors. In the case of native WDR and/or integrated WDR merging in the image sensor 102, the ISP 100 and/or the image sensor 102 may also perform a companding operation. Companding is similar to a non-linear response or processing using the A law and/or the μ (mu) Law to reduce bit-depth from 16 bits or 14 bits to 12 bits.

In contrast to known approaches of image signal processing to achieve wide dynamic range images using different image sensors, the example ISP 100 of FIG. 1 includes flexible data paths and wide dynamic range processing blocks to enable generating WDR images using image data from multiple types of image sensors (e.g., any type of WDR such as the techniques described above).

The example WDR processor 104 of FIG. 1 includes a set of processing blocks 114, 116, 118, 120, 122, 124, 126 that are configurable and/or controllable to process input data (e.g., image data 127) from the image sensor 102 based on the technique(s) used to generate the image data 127. In the example of FIG. 1, the processing blocks of the WDR processor 104 include an interpolator 114, a linearizer 116, a pre-processor 118, a phase shifter 120, a merger 122, a tone mapper 124, and a post-processor 126. The WDR processor 104 outputs a WDR image 134 to the memory 106 and/or to another location based on processing the image data 127 according to a selected WDR processing flow (e.g., using a selected subset of the WDR processing blocks 114-126). As used herein, a processing block, such as the interpolator 114, the linearizer 116, the pre-processor 118, the phase shifter 120, the merger 122, the tone mapper 124, and the post-processor 126, refers to software module or routine executed by a processor and/or circuitry within a processor.

An integrated circuit fabricator may fabricate the ISP 100 of FIG. 1 to include the example interpolator 114, the example linearizer 116, the example pre-processor 118, the example phase shifter 120, the example merger 122, the example tone mapper 124, and/or the example post-processor 126, the memory 106, and the controller 128. In some examples, the ISP 100 is also fabricated to include the architecture recognizer 108, the function selector 110, and the sensor adapter 112. In some examples, one or more of the example interpolator 114, the example linearizer 116, the example pre-processor 118, the example phase shifter 120, the example merger 122, the example tone mapper 124, and/or the example post-processor 126 are implemented by firmware.

The example interpolator 114 of FIG. 1 performs pixel interpolation to determine image data for locations between captured pixels. For example, in the WDR checkerboard pattern, pixels between high-sensitivity pixels may be interpolated to form a full-size high-sensitivity image. The pixels between the high-sensitivity pixels in the checkerboard pattern correspond to the locations in the checkerboard pattern at which the low-sensitivity pixels are captured. Similarly, the interpolator 114 interpolates pixels between the low-sensitivity pixels to form a full-size low-sensitivity image. The pixels between the low-sensitivity pixels in the checkerboard pattern correspond to the locations in the checkerboard pattern at which the high-sensitivity pixels are captured. In some examples, the interpolator 114 interpolates the brightness or intensity of each pixel based on surrounding pixels, while leaving the color information of the pixel intact.

Figure 8:
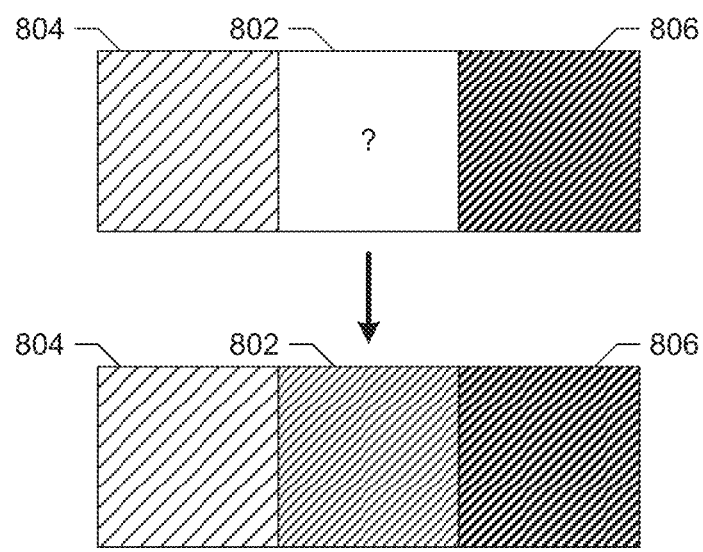
FIG. 8 illustrates an example set of pixels in which the interpolator of FIG. 1 determines a value of a pixel based on interpolating values of adjacent pixels.

FIG. 8 illustrates an example set of pixels in which the interpolator 114 of FIG. 1 determines a value of a pixel 802 based on interpolating values of adjacent pixels 804, 806. In the example of FIG. 8, the pixel 804 has a first value (e.g., higher brightness value) and the pixel 806 has a second value (e.g., a lower brightness value). The example interpolator 114 of FIG. 1 may determine the value (e.g., the brightness) of the pixel 802 by averaging the values of the first and second adjacent pixels 804, 806. As a result, the interpolator 114 assigns a medium brightness value to the pixel 802 that is the average of the first value and the second value. While the example of FIG. 8 uses immediately-adjacent pixels in the same row, in some other examples, the interpolator 114 uses pixel values from immediately adjacent pixels, pixel values from pixels that are diagonal to the pixel 802, pixel values from immediately-adjacent pixels in immediately-adjacent rows and/or from pixel values from pixels that are two or more pixels distant from the pixel 802.

To determine the value of a pixel from values of other pixels, the example interpolator 114 may use techniques such as copying the value from another pixel (e.g., an adjacent pixel), using bilinear interpolation (e.g., linear interpolation in two dimensions), using bicubic interpolation (e.g., cubic interpolation in two dimensions), using finite impulse response (FIR) filtering to increase a sampling rate of the input pixels and re-sample the image, and/or any other interpolation technique.

Returning to FIG. 1, the example linearizer 116 performs linear mapping to transform a lower bit-depth image (e.g., 12 bits-per-channel, 14 bits-per-channel, etc.) having a non-linear light response to a higher bit-depth image (e.g., 16 bits-per-channel, 20 bits-per-channel) having a linear light response. For example, the linearizer 116 may use decompanding techniques to increase the bit-depth of companded image data. Example decompanding techniques include the mu-law (μ-law) algorithm, the A-law algorithm, a generic curve (e.g., a curve that is approximated by a set of piecewise-linear curves), and/or a look up table that maps input values (e.g., input values at lower bit-depths) to output values (e.g., output values at higher bit-depths).

As an example of decompanding using the mu-law algorithm, the example linearizer 116 receives an input signal at a 12 bits-per-channel bit-depth, which is treated as the compressed version of a higher bit-depth signal. The mu-law algorithm does not use a linear relationship between the lower bit-depth signal and the higher bit-depth signal. For example, there may be the same number of segments (e.g., 16 segments) representing a smaller number of smaller values (e.g., 16 segments representing the 16 bit-per-channel numbers 1 to 32) as the number of segments (e.g., 16 segments) representing a larger number of larger values (e.g., 16 segments representing the 16 bit-per-channel numbers 2048 to 4096). In this example, the linearizer 116 converts the 12 bits-per-channel signal to a 16 bits-per-channel signal by determining the corresponding higher bit-depth segment that is mapped to the lower bit-depth value.

The example pre-processor 118 of FIG. 1 performs image pre-processing functions such as noise filtering, defective pixel correction, lens shading, and/or other image processing functions. In the example of FIG. 1, the pre-processor 118 performs non-WDR functions.

The example phase shifter 120 of FIG. 1 performs phase shifting on pixels to select alternating lines of pixels (e.g., in a line-interleaved frame). For example, the phase shifter 120 may perform half-pixel interpolation in the horizontal and/or vertical directions using the long-exposure pixels to generate a long-exposure frame and perform half-pixel interpolation in the horizontal and/or vertical directions using the short-exposure pixels to generate a short-exposure frame. An example interpolation method that may be used by the phase shifter 120 includes up-sampling the frame (e.g., up-sampling by a factor of 2), dropping the initial pixels, and down-sampling the frame (e.g., down-sampling by a factor of 2). In some other examples, the phase shifter 120 uses nearest neighbor interpolation, bilinear interpolation, bicubic interpolation, finite impulse response filtering, and/or any other interpolation methods.

The example merger 122 of FIG. 1 merges multiple frames into a single WDR frame or image (e.g., a higher bit-depth image). In the illustrated example, the merger 122 selects the appropriate portions of each of the images for use in the merged image. The merger 122 then combines the selected portions into a single WDR frame.

An example technique for merging a first frame captured with a long exposure and a second frame captured with a short exposure includes: 1) applying respective gain(s) to the input and increasing the bit-depth of the first and second frames; 2) determining weight(s) to be applied to the pixels in the first frame and the pixels in the second frame; 3) applying the respective weights to the first frame and the second frame; and 4) summing the weighted pixel data from the first frame and the second frame to determine a merged pixel. The example merger 122 of FIG. 1 determines the weights to be applied to the pixels based on the level of motion present in the pixels in an area of a pixel to be weighted. For example, a high level of motion around a pixel may cause the merger 122 to weight the short-exposure frame more highly than the long-exposure frame.

There are multiple different techniques that may be implemented by the merger 122 to merge different frames. For example, the merger 122 may perform motion adaptive and/or compensating merging to merge multiple frames into a single WDR image.

The example tone mapper 124 of FIG. 1 reduces bit-depth of a frame from, for example, 16-bit depth used to define WDR image data to 12-bit depth. In the illustrated example, 12-bit depth is used by the post-processor 126 to perform image processing functions. The example tone mapper 124 of FIG. 1 may use dynamic range compression (DRC) and/or global local brightness and contrast enhancement (GLBCE) to perform the tone mapping. In some other examples, the tone mapper 124 simply drops the 4 least significant bits to reduce the bit depth.

The example post-processor 126 of FIG. 1 performs any additional processing functions that may be desired. For example, the post-processor 126 may perform de-bayer functions (e.g., interpolation of color in an RGBG or similar pixel filter pattern), demosaic functions, anti-aliasing functions, filtering, and/or any other image processing. The example post-processor 126 of the illustrated example stores the resulting image in the memory 106 and/or provides the resulting image to an application for use and/or display. In some examples, the post-processor 126 is omitted.

The example architecture recognizer 108 of FIG. 1 determines an architecture type of the image sensor 102. To this end, in some examples the architecture recognizer 108 receives image data from the image sensor 102 (e.g., image data in a non-WDR mode of the image sensor 102 and/or image data in a WDR mode of the image sensor 102) by manipulating or controlling the image sensor 102 (e.g., sending image sensor control signals 131) to capture one or more frames of image data (e.g., image data 127) for analysis. In other examples, the architecture recognizer 108 accesses a storage device, such as the memory 106 and/or an Electrically Erasable Programmable Read-Only Memory 109 (EEPROM), to obtain an encoded identifier 133 of the image sensor 102. For example, the storage device may be programmed to store the encoded identifier of the architecture of the image sensor 102 by a designer or a manufacturer of a device that includes the image sensor 102 and the ISP 100.

In examples in which the architecture recognizer 108 receives image data from the image sensor 102, the architecture recognizer 108 of the illustrated example identifies a WDR technique implemented by the image sensor 102 using the image data. The example architecture recognizer 108 may identify the WDR technique by, for example, determining a number of separate frames received from the image sensor 102. If the image sensor 102 outputs two frames from one image capture, the example architecture recognizer 108 may determine that the image sensor 102 implements a dual-frame WDR technique (e.g., frame-interleaved WDR).

Additionally or alternatively, in some examples the architecture recognizer 108 compares pixels and/or sets of pixels (e.g., comparing lines of pixels, comparing blocks of pixels) in the image data to identify patterns of pixels having similar brightnesses and/or colors that correspond to interleaved and/or checkerboard patterns. For example, if a brightness pattern in a region of a captured image matches a line-interleaved pattern (e.g., two lines of high brightness adjacent two line of low brightness), the example architecture recognizer 108 determines that the image sensor 102 implements a line-interleaved WDR technique. Alternatively, if a brightness pattern in a region of a captured image matches a checkerboard pattern (e.g., a 2 pixel by 2 pixel block 504 of FIG. 5 in a region of a captured image has a similar brightness as another 2 pixel by 2 pixel block 506 located diagonally from the first 2 pixel by 2 pixel block 504, but has a substantially different brightness than brightnesses of directly adjacent 2 pixel by 2 pixel blocks 508, 510), the example architecture recognizer 108 determines that the image sensor 102 implements a single frame WDR technique with a checkerboard pattern.

Additionally or alternatively, in some examples the example architecture recognizer 108 determines a bit-depth of the received image to identify native WDR image sensors 102. For example, if the bit-depth of the received image data is 16 bits-per-channel or higher, the example architecture recognizer 108 determines that the image sensor 102 is a native WDR sensor 102.

Additionally or alternatively, in some examples the example architecture recognizer 108 determines dimensions of the image data in non-WDR mode and compares the dimensions to image data received in WDR mode (e.g., to identify images having fewer vertical lines of pixels and/or horizontal lines of pixels). If the dimensions in WDR mode are different than dimensions in non-WDR mode, the example architecture recognizer 108 may determine that the image sensor 102 uses line-interleaved WDR. In some examples, rather than or in addition to employing automatic recognition techniques, the architecture recognizer 108 receive one or more inputs identifying the type of WDR technique based on manual determination. Other techniques may additionally or alternatively be used to identify WDR technique(s) implemented by the image sensor 102.

The example function selector 110 of FIG. 1 receives an architecture type and/or a WDR technique 135 output by the architecture recognizer 108 and outputs a WDR processing flow 111 (e.g., a selection and/or order of the WDR processing blocks 114-126). The example function selector 110 utilizes the architecture type and/or the WDR technique identified by the architecture recognizer 108 to select a WDR processing flow appropriate for processing images generated from the image sensor 102. As used herein, a WDR processing flow refers to an ordered set of functions or operations to be performed to generate a WDR image from one or more frames of image data captured by an image sensor. Different WDR processing flows may be used for different WDR techniques. Example WDR processing flows that may be selected by the function selector 110 are discussed below with reference to FIGS. 9-14. WDR processing flows define the order in which the WDR processing blocks 114-126 of the WDR processor 104 are actuated. In some WDR processing flows, a subset of the WDR processing blocks 114-126 are used. In some WDR processing flows, one or more of the WDR processing blocks 114-126 used more than once. The WDR processing blocks 104 may be coupled indirectly (e.g., they may communicate by writing data to and/or accessing data from a memory in a specific order). Additionally or alternatively, some or all of the WDR processing blocks 114-126 may be coupled directly via wiring and controlled switches (e.g., transistors).

The example sensor adapter 112 of FIG. 1 receives as an input the WDR processing flow 111 output by the function selector 110. The example sensor adapter 112 configures the controller 128 (e.g., by outputting controller configuration information 137) to configure some or all of the example interpolator 114, the example linearizer 116, the example pre-processor 118, the example phase shifter 120, the example merger 122, the example tone mapper 124, and/or the example post-processor 126 (e.g., by outputting WDR configuration information 113) to implement the WDR processing flow selected by the function selector 110. The controller 128 of some examples controls the timing of when the various WDR blocks 114-126 act on data in the memory 106. In this manner, the WDR processor 104 automatically adapts to the type of image sensor 102 and/or the imaging sensing techniques used to properly collect the images to be processed. The WDR processor 104, the example interpolator 114, the example linearizer 116, the example pre-processor 118, the example phase shifter 120, the example merger 122, the example tone mapper 124, and/or the example post-processor 126, and/or the controller 128 generates WDR image(s) from input data received from the image sensor 102 according to the configuration implemented by the sensor adapter 112 and/or the controller 128. Additionally or alternatively, the sensor adapter 112 configures some or all of the example interpolator 114, the example linearizer 116, the example pre-processor 118, the example phase shifter 120, the example merger 122, the example tone mapper 124, and/or the example post-processor 126 (e.g., by outputting WDR configuration information 113 to the WDR processor 104 to configure controlled switches such as transistors) to implement the WDR processing flow selected by the function selector 110.

The example controller 128 of FIG. 1 controls the timing of the operation of one or more of the example interpolator 114, the example linearizer 116, the example pre-processor 118, the example phase shifter 120, the example merger 122, the example tone mapper 124, and/or the example post-processor 126 of the WDR processor 104 to process image data and/or to store image data in the memory 106. As mentioned above, the sensor adapter 112 configures the controller 128 to control the WDR processing flow by, for example, configuring and/or activating some or all of the example interpolator 114, the example linearizer 116, the example pre-processor 118, the example phase shifter 120, the example merger 122, the example tone mapper 124, and/or the example post-processor 126 in a sequence to implement the WDR image processing flow appropriate for processing data from the image sensor 102. Such a processing flow or sequence may involve using multiple activities (e.g., iterations or passes) of one or more of the example interpolator 114, the example linearizer 116, the example pre-processor 118, the example phase shifter 120, the example merger 122, the example tone mapper 124, and/or the example post-processor 126.

The controller 128 of the illustrated example controls one or more of the WDR processing blocks of the WDR processor 104 (e.g., the example interpolator 114, the example linearizer 116, the example pre-processor 118, the example phase shifter 120, the example merger 122, the example tone mapper 124, and/or the example post-processor 126) to retrieve data from the memory 106 at a particular time, to process the data, to transfer data to and/or from other ones of the example interpolator 114, the example linearizer 116, the example pre-processor 118, the example phase shifter 120, the example merger 122, the example tone mapper 124, and/or the example post-processor 126, and/or to store data (and/or processed data) in the memory 106.

In some examples, data is exchanged between the example interpolator 114, the example linearizer 116, the example pre-processor 118, the example phase shifter 120, the example merger 122, the example tone mapper 124, and/or the example post-processor 126 by writing it to the memory 106 via the data bus 107 and/or by retrieving the data with the data bus 107 from the memory under the control of the controller 128. In some examples, data is passed directly between the example interpolator 114, the example linearizer 116, the example pre-processor 118, the example phase shifter 120, the example merger 122, the example tone mapper 124, and/or the example post-processor 126 without writing the data back to the memory 106. In some such examples, metadata is used to track the state of the data in the memory 106 as dirty, clean, etc. using a cache coherency protocol or the like.

In some examples, the architecture recognizer 108, the function selector 110, and the sensor adapter 112 perform the recognition, conversion, and configuration the first time the ISP 100 is connected to the image sensor 102 and powered on. After the WDR processor 104 and/or the controller 128 are configured, the example architecture recognizer 108, the function selector 110, and/or the sensor adapter 112 may be bypassed (i.e., not operate to configure the WDR blocks 114-126). Instead, the state of the WDR processor 104 is maintained in memory to avoid the need to reconfigure except when a new image sensor was (or may have been) connected to the ISP 100.

In some examples, the architecture recognizer 108, the function selector 110, and/or the sensor adapter 112 are separate from the ISP 100. For example, the architecture recognizer 108, the function selector 110, and/or the sensor adapter 112 may be communicatively coupled with a configuration port of the ISP 100 to configure the WDR processor 104 (e.g., the example interpolator 114, the example linearizer 116, the example pre-processor 118, the example phase shifter 120, the example merger 122, the example tone mapper 124, and/or the example post-processor 126), and/or the controller 128 based on an identified architecture and/or processing technique of the image sensor 102. The example sensor adapter 112 may communicate with the WDR processor 104 and/or the controller 128 via any communication and/or configuration protocol, such as the IEEE 1149.1 Standard Test Access Port and Boundary-Scan Architecture.

The example ISP 100 of FIG. 1 also includes a clock 130 that provides timing information (e.g., clock signals 129) to the example WDR processor 104 (e.g., the WDR processing blocks 114-126) and/or the controller 128. In some examples, the clock 130 also provides the timing information to the memory 106, the architecture recognizer 108, the function selector 110, the sensor adapter 112, the EEPROM 109, and/or the image sensor 102. The WDR processor 104 (e.g., the WDR processing blocks 114-126) and/or the controller 128 use the timing information to control the execution of instructions during processing of image data to generate WDR images. As discussed below, the oscillation speed of the clock 130 may be based on the capabilities of the image sensor 102.

The example WDR processor 104 of FIG. 1 also includes an execution unit 132 to implement the functions of one or more of the WDR processing blocks 114-126. For example, the execution unit 132 may be a central processing unit (CPU), a graphics processing unit (GPU), an application specific integrated circuit (ASIC), and/or any other type of hardware logic circuit capable of executing instructions to output a result. The example execution unit 132 may be used in examples in which the subset of the WDR processing blocks 114-126 that is selected by the function selector 110 (e.g., in the WDR processing flow) includes one or more WDR processing blocks 114-126 that are implemented in software.

Example configurations of the ISP 100 are disclosed below with reference to FIGS. 9-14. The example sensor adapter 112 of FIG. 1 issues outputs to configure respective subsets of the WDR processing blocks 114-126 of FIG. 1 to generate a WDR image from input data from the image sensor 102. Some of the example configurations shown in FIGS. 9-14 include multiple sub-operations, where each of the sub-operations includes one or more of the WDR processing blocks performed by respective ones of the WDR processing blocks 114-126. For example, if the pre-processor 118 is to execute operations on different frames obtained from the image sensor 102, the ISP 100 may be configured such that the pre-processor 118 executes on different frames in different sub-operations.

Figure 9:
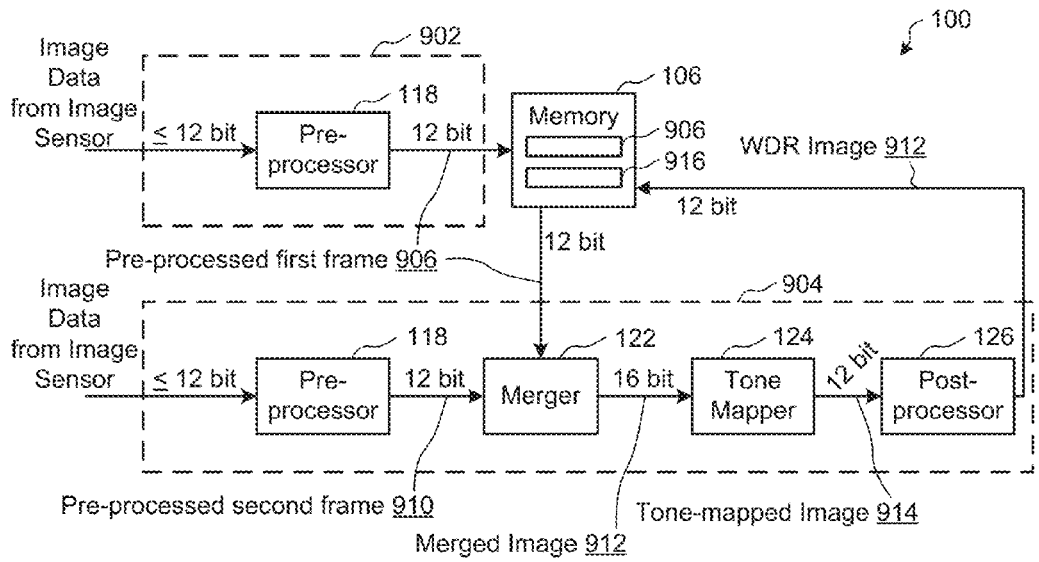
FIG. 9 is a block diagram of an example implementation of the ISP of FIG. 1 after it has been configured by the sensor adapter of FIG. 1 to execute a WDR processing flow based on an image sensor that uses temporal diversity to generate multiple frames of image data.

FIG. 9 is a block diagram of an example implementation of the ISP 100 of FIG. 1 after it has been configured by the sensor adapter 112 of FIG. 1 to execute a WDR processing flow based on an image sensor that uses temporal diversity to generate multiple frames of image data (e.g., frame-interleaving). The example sensor adapter 112 of FIG. 1 may automatically configure the WDR processing blocks 114-126 of the ISP 100 and/or the controller 128 of the ISP 100 to operate as shown in FIG. 9 when the image sensor 102 of FIG. 1 uses temporal diversity to generate multiple frames of image data. In the example of FIG. 9, the ISP 100 executes two sub-operations 902, 904 with two different subsets of the WDR processing blocks 114-126 to process the data.

The configuration of the example ISP 100 illustrated in FIG. 9 executes the first sub-operation 902 to process a first frame of image data received from the image sensor 102 (e.g., a long-exposure frame such as the frame 202 of FIG. 2) and executes the second sub-operation 904 to process a second frame of image data (e.g., a short-exposure frame such as the frame 204 of FIG. 2) and to generate a WDR image from the first and second processed frames.

In the first sub-operation 902, the image sensor 102 generates a first frame based on a long exposure of the image sensor 102 to light (e.g., high light sensitivity). In the example of FIG. 9, the first frame is received from the image sensor 102 in a 12 bits-per-channel bit-depth or less. The example pre-processor 118 performs pre-processing tasks on the first frame and stores (e.g., outputs) the pre-processed first frame 906 in the memory 106. Thus, the first sub-operation 902 is performed by a first subset of the WDR processing blocks including the pre-processor 118 of FIG. 1.

In the second sub-operation 904, the image sensor 102 generates a second frame based on a short exposure of the image sensor 102 to light (e.g., low light sensitivity). In the example of FIG. 9, the second frame is received from the image sensor 102 in a 12 bits-per-channel bit-depth or less. The example pre-processor 118 performs pre-processing tasks on the second frame.

The example merger 122 merges the pre-processed second frame 908 as processed by the pre-processor 118 with the first frame 906 via in the memory 106 during the first sub-operation 902. For example, the merger 122 selects appropriate portions from each of multiple frames for use or inclusion in the merged image as described above. When merging the images, the example merger 122 of this example also upscales the images to 16 bit-per-channel bit-depth (e.g., WDR bit-depth).

The example tone mapper 124 of FIG. 9 performs tone mapping on a merged image 912 (e.g., output by the merger 122) to downscale the merged image to a 12 bit-per-channel tone-mapped image 914. The example post-processor 126 then performs any desired post-processing techniques (color enhancement, color conversion, noise filtering, etc.) on the tone-mapped image 914 (e.g., output by the tone mapper 124) and stores the resulting WDR image 916 in the memory 106 for subsequent use. Thus, the example second sub-operation 904 of FIG. 9 is performed by a second subset of the WDR processing blocks including the pre-processor 118, the merger 122, the tone mapper 124, and the post-processor 126 of FIG. 1.

Figure 10:
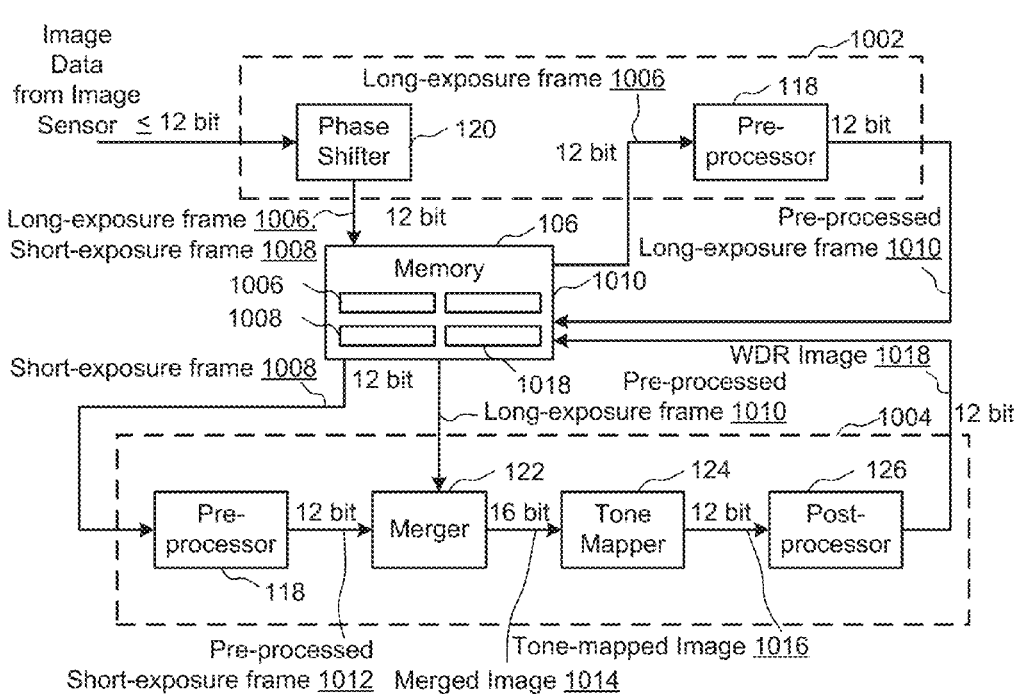
FIG. 10 is a block diagram of an example implementation of the image signal processor of FIG. 1 after it has been configured by the sensor adapter of FIG. 1 to execute a wide dynamic range processing flow based on an image sensor that uses spatial diversity to generate multiple frames of image data.

FIG. 10 is a block diagram of an example implementation of the ISP 100 of FIG. 1 after it has been configured by the sensor adapter 112 of FIG. 1 to execute a WDR processing flow based on an image sensor that uses spatial diversity to generate multiple frames of image data. The example sensor adapter 112 of FIG. 1 may automatically configure the WDR processing blocks 114-126 of the ISP 100 and/or the controller 128 of the ISP 100 to operate as shown in FIG. 10 when the image sensor 102 of FIG. 1 uses spatial diversity to generate multiple frames of image data. In the example of FIG. 10, the ISP 100 executes two sub-operations 1002, 1004 with two different subsets of the WDR processing blocks to process the data.

The configuration of the example ISP 100 illustrated in FIG. 10 executes the first sub-operation 1002 to perform phase-shifting on image data (e.g., the frame 302 of FIG. 3) received from the image sensor 102 to generate two frames of image data 1006, 1008, and to pre-process one of the frames of image data. The configuration executes the second sub-operation 1004 to process the second one of the frames of image data and to generate a WDR image from the first and second processed frames.

In the first sub-operation 1002 of FIG. 10, the example ISP 100 receives image data (e.g., via the phase shifter 120) including a line-interleaved image that is received by the phase shifter 120. The image received at the phase shifter 120 is at a 12 bit-per-channel bit-depth or less. The example phase shifter 120 splits the line-interleaved image into a long-exposure frame 1006 and a short-exposure frame 1008 and stores the frames 1006, 1008 in the memory 106. As part of splitting the line-interleaved image, the example phase shifter 120 performs interpolations to determine pixel values for the long-exposure frame 1006 and the short-exposure frame 1008. The phase shifter 120 provides the frames 1006, 1008 with pixel values for pixels that were not omitted at the corresponding exposure level (e.g., provides pixel values in the short exposure frame 1008 for pixel lines that had long exposures in the received image data). In some examples, generating the line-interleaved image and storing the frames 1006, 1008 in the memory 106 are performed as a capture process separate from the first sub-operation 1002 (e.g., by using on-the-fly processing for phase shifter 120).

During the first sub-operation 1002, the example pre-processor 118 of FIG. 1 also performs pre-processing on the long-exposure frame 1006 stored in the memory 106 (e.g., lens shading correction, correcting for defective pixels, etc.), and stores a pre-processed long-exposure frame 1010 in the memory 106. Thus, in the example of FIG. 10, the first sub-operation 1002 is performed by a first subset of the WDR processing blocks including the phase shifter 120 and the pre-processor 118.

During the second sub-operation 1004, the example pre-processor 118 pre-processes the short-exposure frame 1008 stored in the memory 106 (e.g., to perform lens shading correction, correcting for defective pixels, etc.) to generate a pre-processed short-exposure frame 1012. The example merger 122 merges the pre-processed short-exposure frame 1012 with the pre-processed long-exposure frame 1010 stored in the memory 106 during the first sub-operation 1002. When merging the images, the example merger 122 also upscales the images to 16 bit-per-channel bit-depth (e.g., WDR bit-depth).

During the second sub-operation 1004, the example tone mapper 124 also performs tone mapping on the merged image 1014 (e.g., output from the merger 122) to downscale the merged image 1014 to a 12 bit-per-channel tone-mapped image 1016. The example post-processor 126 then performs any desired post-processing techniques (color enhancement, color conversion, noise filtering, etc.) on the tone-mapped image 1016 (e.g., output from the tone mapper 124) and stores (e.g., outputs) the resulting WDR image 1018 in the memory 106 for subsequent use. In the example of FIG. 10, the post-processor 126 also re-sizes the tone-mapped image vertically by a factor of 2 to compensate for loss of spatial resolution in the line-interleaved image data. Thus, in the example of FIG. 10, the second sub-operation 1004 is performed by a second subset of the WDR processing blocks including the pre-processor 118, the merger 122, the tone mapper 124, and the post-processor 126.

Figure 11:
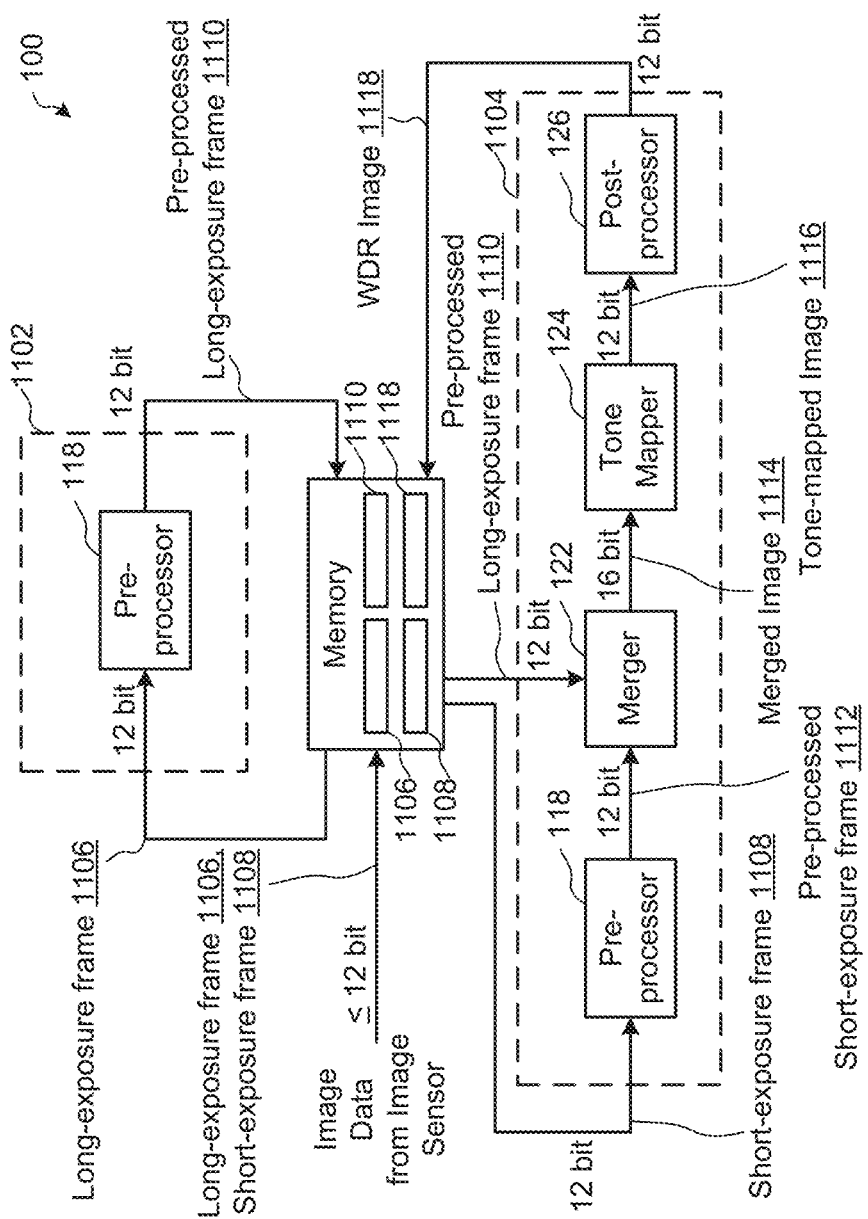
FIG. 11 is a block diagram of an example implementation of the image signal processor of FIG. 1 after it has been configured by the sensor adapter of FIG. 1 to execute a wide dynamic range processing flow based on an image sensor that uses a combination of spatial diversity and temporal diversity to generate multiple frames of image data.

FIG. 11 is a block diagram of an example implementation of the ISP 100 of FIG. 1 after it has been configured by the sensor adapter 112 of FIG. 1 to execute a WDR processing flow based on an image sensor that uses a combination of spatial diversity and temporal diversity to generate multiple frames of image data. The example sensor adapter 112 of FIG. 1 may automatically configure the WDR processing blocks 114-126 of the ISP 100 and/or the controller 128 of the ISP 100 to operate as shown in FIG. 11 when the image sensor 102 of FIG. 1 uses a combination of spatial diversity and temporal diversity to generate multiple frames of image data. In the example of FIG. 11, the ISP 100 executes two sub-operations 1102, 1104 with two different subsets of the WDR processing blocks to process the data.

In the example illustrated in FIG. 11, the ISP 100 executes the first sub-operation 1102 to process a first frame of image data (e.g., the long exposure frame 402 of FIG. 4) received from the image sensor 102 and executes the second sub-operation 1104 to process the second frame of image data (e.g., the short exposure frame 404 of FIG. 4) and to generate a WDR image from the first and second processed frames.

In the first sub-operation 1102, the example image sensor 102 generates a captured image including both long-exposure and short exposure frames 1106, 1108 that are spatially diverse. The example memory 106 stores the long exposure frame 1106 and the short-exposure 1108. The example pre-processor 118 performs pre-processing on the long-exposure frame 1106 to generate a pre-processed long exposure frame 1110. The pre-processor 118 stores the pre-processed long-exposure frame 1110 in the memory 106. Thus, the example first sub-operation 1102 of FIG. 11 is performed by a first subset of the WDR processing blocks including the pre-processor 118 of FIG. 1.

During the second sub-operation 1104, the example pre-processor 118 pre-processes the short-exposure frame 1108 stored in the memory 106 (e.g., lens shading correction, correcting for defective pixels, etc.) to generate a pre-processed short-exposure frame 1112. The example merger 122 merges the pre-processed short-exposure frame 1112 as processed by the pre-processor 118 with the long-exposure frame 1110 as processed by the pre-processor 118 and stored in the memory 106 during the first sub-operation 1102. When merging the images, the example merger 122 also upscales the images to 16 bit-per-channel bit-depth (e.g., WDR bit-depth).

During the second sub-operation 1104, the example tone mapper 124 performs tone mapping on the merged image 1114 (e.g., output from the merger 122) to downscale the merged image 1114 to a 12 bit-per-channel tone-mapped image 1116. The example post-processor 126 then performs any desired post-processing techniques 126 (color enhancement, color conversion, noise filtering, etc.) on the tone-mapped image 1116 (e.g., output from the tone mapper 124) and stores the resulting WDR image 1118 in the memory 106 for subsequent use. Thus, the example second sub-operation 1104 of FIG. 11 is performed by a second subset of the WDR processing blocks including the pre-processor 118, the merger 122, the tone mapper 124, and the post-processor 126 of FIG. 1.

Figure 12:
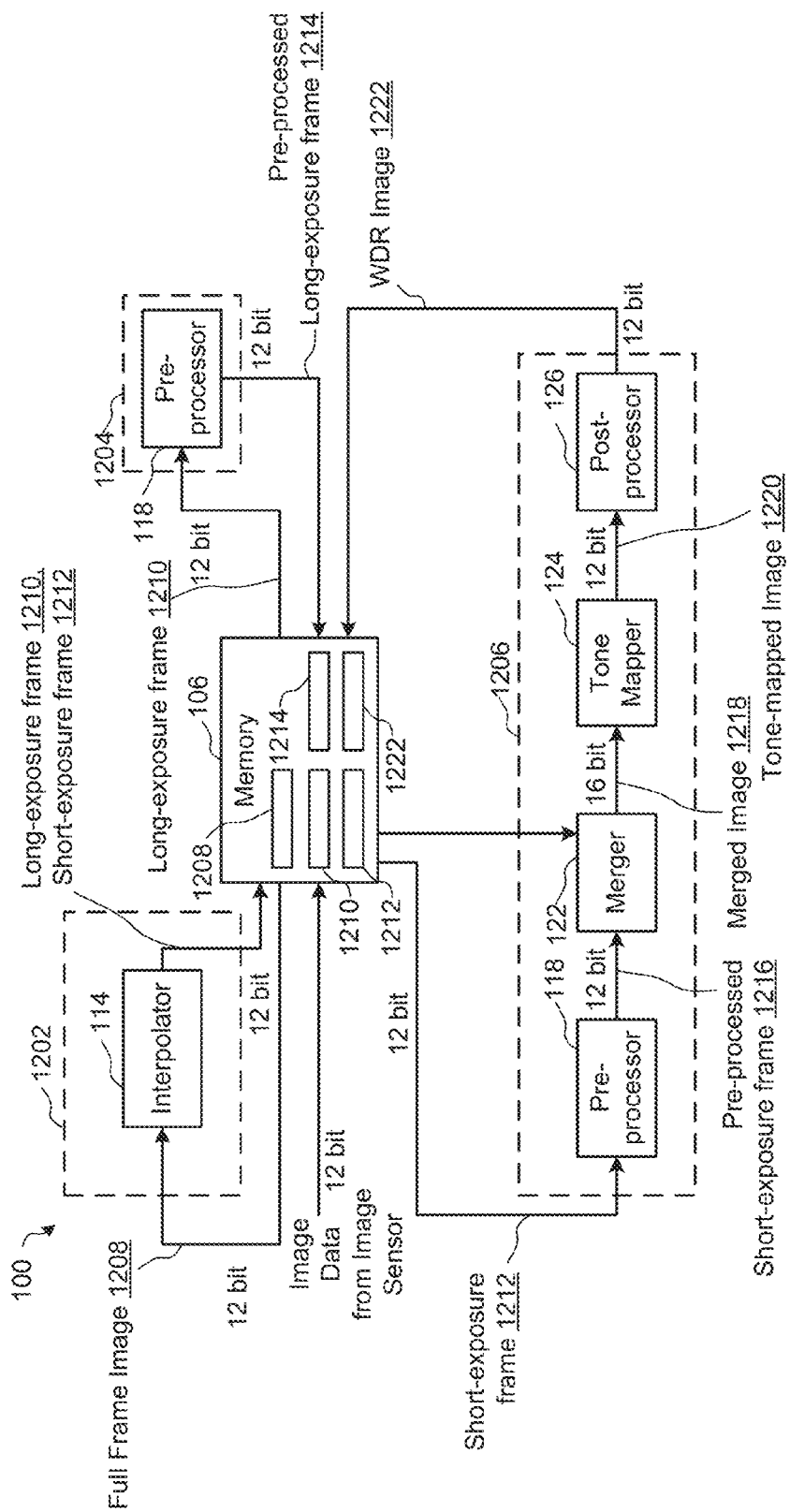
FIG. 12 is a block diagram of an example implementation of the image signal processor of FIG. 1 after it has been configured by the sensor adapter of FIG. 1 to execute a wide dynamic range processing flow based on an image sensor that uses a single frame wide dynamic range and a checkerboard pattern.

FIG. 12 is a block diagram of an example implementation of the ISP 100 of FIG. 1 after it has been configured by the sensor adapter 112 of FIG. 1 to execute a WDR processing flow based on an image sensor that uses a single frame wide dynamic range and a checkerboard pattern. The example sensor adapter 112 of FIG. 1 may automatically configure the WDR processing blocks 114-126 of the ISP 100 and/or the controller 128 of the ISP 100 to operate as shown in FIG. 12 when the image sensor 102 of FIG. 1 uses a single frame wide dynamic range and a checkerboard pattern. In the example of FIG. 12, the ISP 100 executes three sub-operations 1202, 1204, 1206 with three different subsets of the WDR processing blocks to process the data.

The configuration of the example ISP 100 illustrated in FIG. 12 executes the first sub-operation 1202 to interpolate the image data received from an image sensor (e.g., the data in the checkerboard pattern illustrated in FIG. 5) to generate and store two frames of image data, executes the second sub-operation 1204 to process a first one of the frames, and executes the third sub-operation 1206 to process a second one of the frames and generate a WDR image from the first and second processed frames.

In the first sub-operation 1202, the example image sensor 102 generates a full frame image 1208 that has a checkerboard pattern of low-sensitivity data and high-sensitivity data. The example interpolator 114 generates a long-exposure frame 1210 by interpolating between high-sensitivity pixels in the full frame image 1208 as described above. The example interpolator 114 stores the long-exposure frame 1210 in the memory 106. Similarly, the interpolator 114 generates a short-exposure frame 1212 by interpolating between low-sensitivity pixels in the full frame image 1208 and stores the short-exposure frame 1212 in the memory 106. Thus, the example Thus, the first sub-operation 1202 uses a subset of the WDR processing blocks including the interpolator 114 of FIG. 1.

During the second sub-operation 1204, the example pre-processor 118 performs pre-processing on the long-exposure frame 1210 to generate a pre-processed long exposure frame 1214. The pre-processor 118 stores the pre-processed long-exposure frame 1214 in the memory 106. Thus, the second sub-operation 1204 uses a subset of the WDR processing blocks including the pre-processor 118 of FIG. 1.

During the third sub-operation 1206, the example pre-processor 118 pre-processes the short-exposure frame 1212 stored in the memory 106 (e.g., lens shading correction, correcting for defective pixels, etc.) to generate a pre-processed short-exposure frame 1216. The example merger 122 merges the pre-processed short-exposure frame 1216 with the pre-processed long-exposure frame 1214 as processed by the pre-processor 118 and stored in the memory 106 during the second sub-operation 1204. When merging the images, the example merger 122 also upscales the images to 16 bit-per-channel bit-depth merged image 1218 (e.g., WDR bit-depth).

The example tone mapper 124 performs tone mapping on the merged image 1218 (e.g., output from the merger 122) to downscale the merged image 1218 to a 12 bit-per-channel tone-mapped image 1220. The example post-processor 126 then performs any desired post-processing techniques 126 (color enhancement, color conversion, noise filtering, etc.) on the tone-mapped image 1220 (e.g., output from the tone mapper 124) and stores the resulting WDR image 1222 in the memory 106 for subsequent use. Thus, the example third sub-operation 1206 of FIG. 12 is performed by a second subset of the WDR processing blocks including the pre-processor 118, the merger 122, the tone mapper 124, and the post-processor 126 of FIG. 1.

Figure 13:
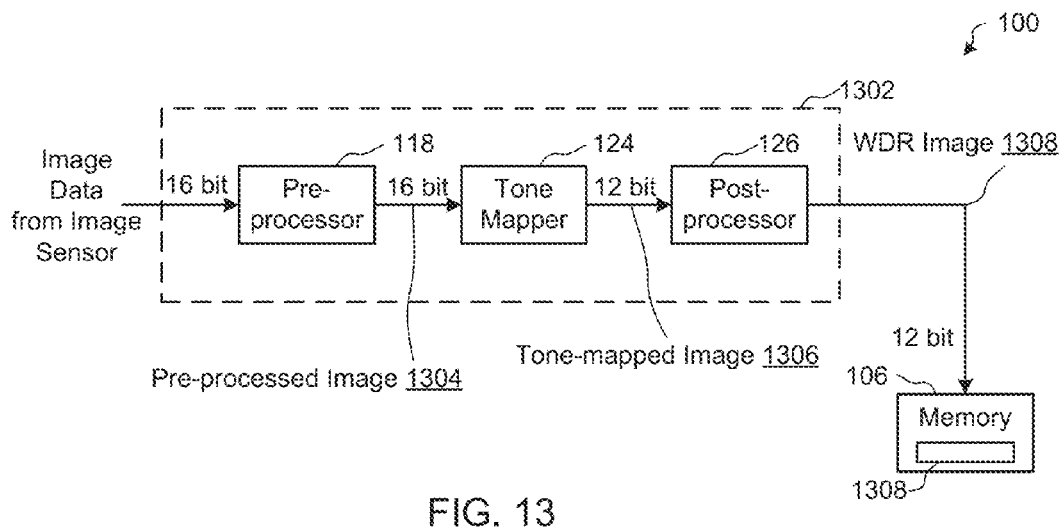
FIG. 13 is a block diagram of an example implementation of the image signal processor of FIG. 1 after it has been configured by the sensor adapter of FIG. 1 to execute a wide dynamic range processing flow based on a native wide dynamic range image sensor.

FIG. 13 is a block diagram of an example implementation of the ISP 100 of FIG. 1 after it has been configured by the sensor adapter 112 of FIG. 1 to execute a WDR processing flow based on a native WDR image sensor. The example sensor adapter 112 of FIG. 1 may automatically configure WDR processing blocks 114-126 of the ISP 100 and/or the controller 128 of the ISP 100 to operate as shown in FIG. 13 when the image sensor 102 of FIG. 1 is a native WDR image sensor (e.g., an image sensor that generates a wide dynamic range output at 16 bits-per-pixel of bit-depth). In the example of FIG. 13, the configuration of the ISP 100 includes one operation 1302 with a subset of the WDR processing blocks to process the data.

The configuration of the example ISP 100 illustrated in FIG. 13 executes the operation to process native WDR data (e.g., high bit-depth data) and, in some examples, reduce the bit-depth to a bit-depth used by other processing functions.

During the operation 1302, the pre-processor 118 receives an image (e.g., a 16 bit-per-channel image) captured by an image sensor. The example pre-processor 118 pre-processes the captured image (e.g., lens shading correction, correcting for defective pixels, etc.) to generate a pre-processed image 1304. Because the pre-processed image 1304 is already a WDR image, the configuration of example ISP 100 shown in FIG. 13 bypasses or omits the merger 122 and provides the pre-processed image 1304 from the output of the pre-processor 118 to the input of the tone mapper 124.

The example tone mapper 124 performs tone mapping on the pre-processed image 1304 to downscale the pre-processed image to a 12 bit-per-channel tone-mapped image 1306. The example post-processor 126 performs any desired post-processing techniques 126 (color enhancement, color conversion, noise filtering, etc.) on the tone-mapped image 1306 and stores a resulting WDR image 1308 in the memory 106 for subsequent use. Thus, the example operation 1302 is performed by a subset of the WDR processing blocks including the pre-processor 118, the tone mapper 124, and the post-processor 126 of FIG. 1.

Figure 14:
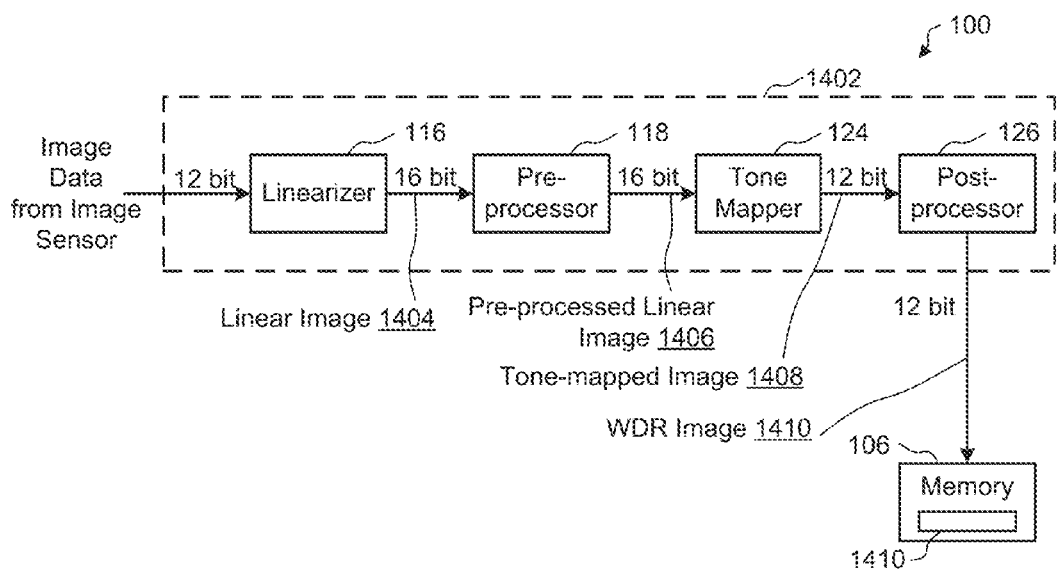
FIG. 14 is a block diagram of an example implementation of the image signal processor of FIG. 1 after it has been configured by the sensor adapter of FIG. 1 to execute a wide dynamic range processing flow based on a non-linear image sensor.

FIG. 14 is a block diagram of an example implementation of the ISP 100 of FIG. 1 after it has been configured by the sensor adapter 112 of FIG. 1 to execute a WDR processing flow based on a non-linear image sensor. The example sensor adapter 112 of FIG. 1 may automatically configure the WDR processing blocks 114-126 of the ISP 100 and/or the controller 128 of the ISP 100 to operate as shown in FIG. 14 when the image sensor 102 of FIG. 1 is a non-linear image sensor 102 (e.g., logarithmic, compounded, etc.). In the example of FIG. 14, the configuration 1400 includes one pass or operation 1402 through the WDR processor 104. Non-linear images are generated to have wide dynamic range and may have 12 bits-per-channel, 14 bits-per-channel, and/or 16 bits-per-channel of bit-depth. In the example of FIG. 14, the configuration of the ISP 100 includes one operation 1402 with a subset of the WDR processing blocks to process the data.

The configuration of the example ISP 100 illustrated in FIG. 14 executes the operation to linearize (e.g., perform decompanding as described above) and then process image data that has a non-linear illumination-to-output data relationship.

In the example operation 1402, the image sensor 102 captures a frame or image having a non-linear light response. For example, the frame or image may have a illumination-to-output signal response similar to the response 600 shown and described with reference to FIG. 6. The example linearizer 116 converts the non-linear image to a linear image 1404 (e.g., performs linear mapping, decompanding, or another linearization technique). The example pre-processor 118 pre-processes the linear image 1404 (e.g., lens shading correction, correcting for defective pixels, etc.) to generate a pre-processed linear image 1406. Because the pre-processed linear image 1406 is already a WDR image, the example operation 1402 bypasses or omits the merger 122 and provides the pre-processed linear image 1406 from the output of the pre-processor 118 to the input of the tone mapper 124.

The example tone mapper 124 performs tone mapping on the pre-processed linear image 1406 to downscale the pre-processed linear image to a 12 bit-per-channel tone-mapped image 1408. The example post-processor 126 then performs any desired post-processing techniques 126 (color enhancement, color conversion, noise filtering, etc.) on the tone-mapped image 1408 (e.g., output from the tone mapper 124) and stores a resulting WDR image 1410 in the memory 106 for subsequent use. Thus, the example operation 1402 is performed by a subset of the WDR processing blocks including the linearizer 116, the pre-processor 118, the tone mapper 124, and the post-processor 126 of FIG. 1.

While each of the example WDR processing flows of FIGS. 9-14 include a tone mapper 124 to reduce the bit-depth of the image data, any of the foregoing examples may be modified to omit or bypass the tone mapper 124, resulting in storing higher bit-depth images. In this manner, the example ISP of FIG. 1 may support both legacy devices that use lower bit-depth images (e.g., 12 bits-per-channel) and future devices that are capable of using higher bit-depth images (e.g., 16 bits-per-channel).

Table 1 below shows example clock speeds and memory bandwidths for each of the example WDR techniques (and corresponding WDR processing flows) discussed above. The example clock speeds of Table 1 may be used to determine an appropriate oscillation speed for the clock 130 of FIG. 1. The example memory bandwidths may be used to determine an appropriate memory bandwidth for the data bus 107 between the memory 106 and the WDR processor 104 (e.g., the WDR processing blocks 114-126). Failing to adhere to the example parameters in Table 1 below may result in sub-optimal frame rate performance when, for example, capturing WDR images in rapid succession (e.g., the image processing would take longer than the image sensor 102 needs to capture the frames, resulting in a processing bottleneck at the ISP 100). In Table 1 below, the example clock parameters assume that there is a single clock for the entire ISP 100, including the example interpolator 114, the example linearizer 116, the example pre-processor 118, the example phase shifter 120, the example merger 122, the example tone mapper 124, and/or the example post-processor 126. The power requirements and/or performance of the example ISP 100 may be improved by using multiple clock domain(s), but would require additional design complexity and/or additional silicon area requirements on the integrated circuit.

TABLE 1

Clock Speeds and Memory Bandwidths for Example WDR Techniques

| | Proposed WDR Processing Flow Parameters | | |
|---|---|---|---|
| WDR Techniques | Number of WDR Processor 104 Operations/ Sub-Operations | Required Clock Speed for ISR (for single clock), where X = pixel rate of Image Sensor 102 | Required Memory Bandwidth, where Y = single frame Bayer input |
| Multiple-sampling with Temporal Diversity (frame interleaving) | 2 | 2*X | 3*Y |
| Multiple-sampling with Spatial Diversity (line interleaving) | 2 | X | 5.5*Y |
| Multiple-sampling with both Temporal and Spatial Diversity (simultaneous interleaving) | 2 | X | 6*Y |
| Single Frame WDR with Checkerboard Pattern | 3 | 3*X | 8*Y |
| Native WDR Sensor | 1 | X | Y |
| Non-Linear Sensor | 1 | X | Y |

The example clock speeds in Table 1 above are expressed in terms of the pixel rate X. The example memory bandwidths in Table 1 above are expressed in terms of the number of bits (or bytes) in a single Bayer-filtered input frame Y.

While an example manner of implementing the ISP 100 is illustrated in FIGS. 1 and 9-14, one or more of the elements, processes and/or devices illustrated in FIGS. 1 and 9-14 may be combined, divided, re-arranged, omitted, eliminated and/or implemented in any other way. Further, the example WDR processor 104, the example memory 106, the example architecture recognizer 108, the example function selector 110, the example sensor adapter 112, the example controller 128, and/or the example WDR processing blocks including the example interpolator 114, the example linearizer 116, the example pre-processor 118, the example phase shifter 120, the example merger 122, the example tone mapper 124, and/or the example post-processor 126 and/or, more generally, the example ISP 100 of FIG. 1 may be implemented by hardware, software, firmware and/or any combination of hardware, software and/or firmware. Thus, for example, any of the example WDR processor 104, the example memory 106, the example architecture recognizer 108, the example function selector 110, the example sensor adapter 112, the example controller 128, and/or the example WDR processing blocks including the example interpolator 114, the example linearizer 116, the example pre-processor 118, the example phase shifter 120, the example merger 122, the example tone mapper 124, and/or the example post-processor 126 and/or, more generally, the example ISP 100 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example WDR processor 104, the example memory 106, the example architecture recognizer 108, the example function selector 110, the example sensor adapter 112, the example controller 128, and/or the example WDR processing blocks including the example interpolator 114, the example linearizer 116, the example pre-processor 118, the example phase shifter 120, the example merger 122, the example tone mapper 124, and/or the example post-processor 126 is/are hereby expressly defined to include a tangible computer readable storage device or storage disk such as a memory, a digital versatile disk (DVD), a compact disk (CD), a Blu-ray disk, etc. storing the software and/or firmware. Further still, the example ISP 100 of FIG. 1 may include one or more elements, processes and/or devices in addition to, or instead of, those illustrated in FIG. 1, and/or may include more than one of any or all of the illustrated elements, processes and devices.

Flowcharts representative of example machine readable instructions for implementing the ISP 100 are shown in FIGS. 15, 16, 17A-17E, and 18. In these examples, the machine readable instructions comprise program(s) for execution by a processor such as the processor(s) 1912, 2012, 2112 shown in the example processor platform(s) 1900, 2000, 2100 discussed below in connection with FIGS. 19, 20, and/or 21 and/or by the ISP 100 shown in the processor platform(s) 1900, 2000 of FIGS. 19 and/or 20. The program(s) may be embodied in software stored on a tangible computer readable storage medium such as a CD-ROM, a floppy disk, a hard drive, a digital versatile disk (DVD), a Blu-ray disk, or a memory associated with the processor(s) 1912, 2012, 2112 and/or the ISP 100, but the entire program(s) and/or parts thereof could alternatively be executed by a device other than the processor(s) 1912, 2012, 2112 and/or the ISP 100 and/or embodied in firmware or dedicated hardware. Further, although the example program(s) are described with reference to the flowcharts illustrated in FIGS. 15, 16, 17A-17E, and/or 18, many other methods of implementing the example ISP 100 may alternatively be used. For example, the order of execution of the blocks may be changed, and/or some of the blocks described may be changed, eliminated, or combined.

As mentioned above, the example processes of FIGS. 15, 16, 17A-17E, and/or 18 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and transmission media. As used herein, "tangible computer readable storage medium" and "tangible machine readable storage medium" are used interchangeably. Additionally or alternatively, the example processes of FIGS. 15, 16, 17A-17E, and/or 18 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and transmission media. As used herein, when the phrase "at least" is used as the transition term in a preamble of a claim, it is open-ended in the same manner as the term "comprising" is open ended.

Figure 15:
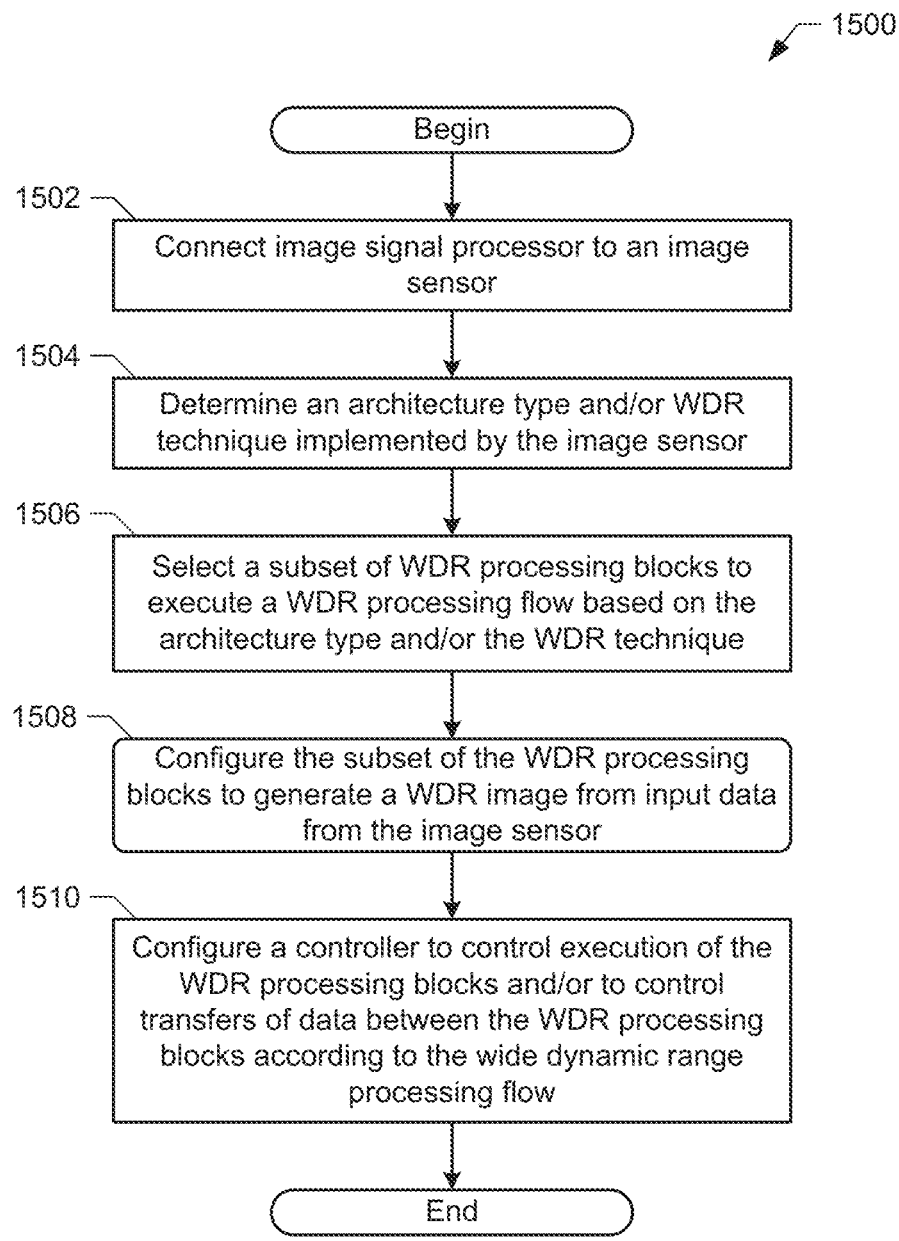
FIG. 15 is flowchart representative of an example process which may be performed to configure an image signal processor (ISP) based on an image sensor.

FIG. 15 is flowchart representative of an example process 1500 which may be performed to configure an ISP (e.g., the ISP 100 of FIG. 1) based on an image sensor (e.g., the image sensor 102). The example process may be performed by the example ISP 100 of FIG. 1. However, one or more portions of the example process 1500 may be performed manually.

The example processing begins with connecting the ISP 100 of FIG. 1 to an image sensor 102 (block 1502). The image sensor 102 may be of any type and, at the time of connection, the specific type of the image sensor 102 may not be known to the ISP 100 prior to the connection.

In order to configure itself to process data from the image sensor 102, the ISP 100 of the illustrated example first determines the architecture type and/or WDR technique implemented by the image sensor 102 (block 1504). For example, the ISP 100 may access an EEPROM 109 or other storage device to retrieve a code or other encoded identifier that identifies the image sensor (e.g., a model number) and/or otherwise indicates the architecture type (e.g., which may be identified by a circuit designer or product designer and encoded into the EEPROM 109 or other storage device). The ISP 100 may then look up the code (e.g., in a lookup table) to determine the architecture type of the image sensor 102. In some other examples, the architecture recognizer 108 controls the image sensor 102 to capture image data in a WDR mode, and receives an output frame and/or image from the image sensor 102. The example ISP 100 may determine a WDR technique implemented by the image sensor 102 by analyzing the captured image data based on, for example, the bit-depth (e.g., 12 bits or 16 bits), a comparison of pixels in different selections of pixels (e.g., to identify a checkerboard pattern and/or line-interleaved WDR), and/or any other technique to determine an architecture type and/or a WDR imaging technique corresponding to the image data.

The example function selector 110 selects a subset of the WDR processing blocks 114-126 to execute a wide dynamic range processing flow based on the determined architecture type and/or the WDR technique (block 1506). For example, the function selector may select one or more of the example interpolator 114, the example linearizer 116, the example pre-processor 118, the example phase shifter 120, the example merger 122, the example tone mapper 124, and/or the example post-processor 126 for inclusion in the subset, depending on what operations are needed to process the image data.

The example sensor adapter 112 of FIG. 1 configures the subset of the WDR processing blocks 114-126 to generate a WDR image from the input data from an image sensor (block 1508). For example, the sensor adapter 112 may configure the WDR processing blocks 114-126 to implement the WDR processing flow using the corresponding ones of the example interpolator 114, the example linearizer 116, the example pre-processor 118, the example phase shifter 120, the example merger 122, the example tone mapper 124, and/or the example post-processor 126.

In some examples, the sensor adapter 112 configures the subset of the WDR processing blocks 114-126 by selecting the WDR processing flow to include a set of sub-operations (e.g., the sub-operations 902, 904, 1002, 1004, 1102, 1104, 1202, 1204, 1206, 1302, 1402 of FIGS. 9-14) and configuring ones of the sub-operations 902, 904, 1002, 1004, 1102, 1104, 1202, 1204, 1206 to implement selected ones of the WDR processing blocks 114-126. Example instructions to implement block 1508 of FIG. 15 are described below with reference to FIGS. 16 and/or 17A-17E.

The example sensor adapter 112 of FIG. 1 also configures the controller 128 to control the sequence of execution of the WDR processing blocks in the WDR processing flow and/or to control transfers of data between the WDR processing blocks according to the WDR processing flow (block 1510). For example, the sensor adapter 112 may configure the controller 128 to control the appropriate data pathways for WDR processing blocks that are implemented using hardware circuits and/or controlled switches (e.g., transistors, etc.), and/or to configure the WDR processing blocks that are implemented using software to access, store, transmit, and/or receive data in a sequence defined by the WDR processing flow.

Using the example of FIG. 9 above, the function selector 110 selects a subset of the WDR processing blocks to include the pre-processor 118, the merger 122, the tone mapper 124, and the post-processor 126 to execute a WDR processing flow based on the architecture recognizer 108 determining the architecture type of the image sensor 102 and/or the WDR technique of the image sensor 102 to be frame-interleaving. The example sensor adapter 112 then configures the first sub-operation 902 to include the pre-processor 118 and configures the second sub-operation 904 to include the pre-processor 118, the merger 122, the tone mapper 124, and the post-processor 126. For example, to configure the first sub-operation 902, the example sensor adapter 112 may configure one or more data pathways to provide image data to the pre-processor 118 and/or to provide data from the pre-processor 118 to the memory 106. In some other examples, the sensor adapter 112 may configure the first sub-operation 902 by configuring the controller 128 to control the transfer of image data to the pre-processor 118, to control execution by the pre-processor 118, and/or to control the transfer of data from the pre-processor 118 to the memory 106.

After configuring the controller 128 (block 1510), the example instructions 1500 of FIG. 15 end.

Figure 16:
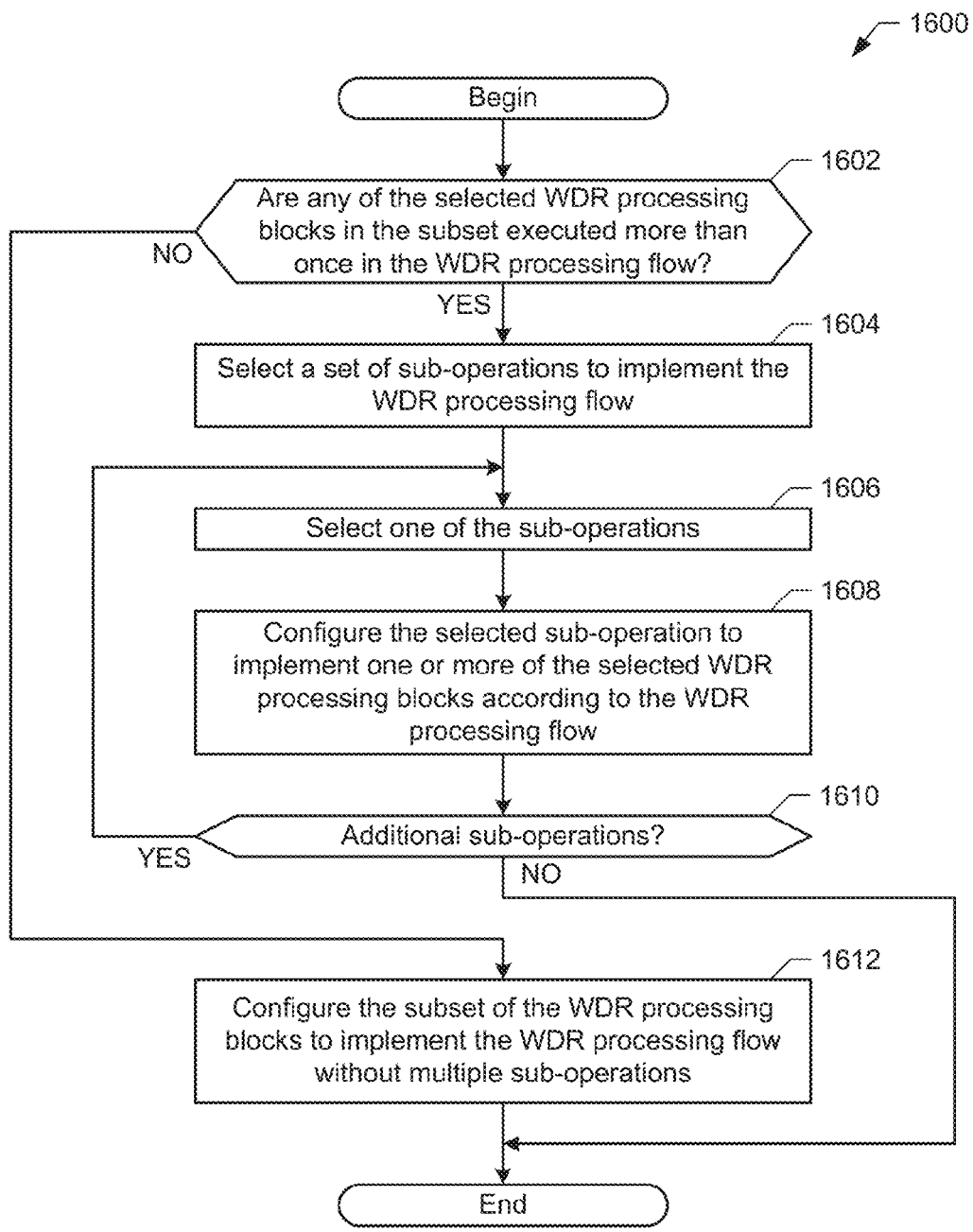
FIG. 16 is a flowchart representative of example machine readable instructions which may be executed to implement the example sensor adapter of FIG. 1 to configure the WDR processing blocks to generate a WDR image from input data from an input sensor.

FIG. 16 is a flowchart representative of example machine readable instructions 1600 which may be executed to implement the example sensor adapter 112 of FIG. 1 to configure the WDR processing blocks to generate a WDR image from input data from an input sensor 102. The example instructions 1600 of FIG. 16 may be executed to implement block 1508 of FIG. 15. In the example instructions 1600, the subset of WDR processing blocks has been selected in block 1506 of FIG. 15 to execute a WDR processing flow based on an architecture type and/or a WDR technique.

The example sensor adapter 112 of FIG. 1 determines whether any of the selected WDR processing blocks 114 in the subset (e.g., selected in block 1506 of FIG. 15) are executed more than once in the selected WDR processing flow (block 1602). For example, the example subset of the WDR processing blocks shown in FIG. 10, including the phase shifter 120, the pre-processor 118, the merger 122, the tone mapper 124, and the post-processor 126, executes the pre-processor 118 multiple times.

When any of the selected WDR processing blocks 114 in the subset are executed more than once in the selected WDR processing flow (block 1602), the example sensor adapter 112 selects a set of sub-operations to implement the WDR processing flow (block 1604). Using the example of FIG. 10, the sensor adapter 112 selects two sub-operations 1002, 1004 to implement the WDR processing flow. The number of sub-operations selected 1002 may be based on a highest number of times any of the selected WDR processing blocks 114-126 is to be executed.

The example sensor adapter 112 selects one of the sub-operations (block 1606) and configures the selected sub-operation to implement one or more of the selected WDR processing blocks according to the WDR processing flow (block 1608). Using the example of FIG. 10, the sensor adapter 112 selects the sub-operation 1002 and configures the sub-operation 1002 to execute the phase shifter 120 and the pre-processor 118. The sensor adapter 112 determines whether there are additional sub-operations (block 1610). When there are additional sub-operations (block 1610), control returns to block 1606 to select another one of the sub-operations. In the example of FIG. 10, the sensor adapter 112 iterates blocks 1606 and 1608 to select the second sub-operation 1004 (block 1606) and configure the second sub-operation 1004 to execute the pre-processor 118, the merger 122, the tone mapper 124, and the post-processor 126 (block 1608).

When none of the selected WDR processing blocks in the subset (selected in block 1506 of FIG. 15) are executed more than once in the selected WDR processing flow (block 1602), the example sensor adapter 112 configures the subset of the WDR processing blocks to implement the WDR processing flow without multiple sub-operations (block 1612). For example, in the examples of FIGS. 13 and 14, a single operation is used to implement the respective subsets of the WDR processing blocks (e.g., the pre-processor 118, the tone mapper 124, and the post-processor 126 in FIG. 13, the linearizer 116, the pre-processor 118, the tone mapper 124, and the post-processor 126 in FIG. 14).

When there are no further sub-operations (block 1610) or after configuring the subset of the WDR processing blocks to implement the WDR processing flow without multiple sub-operations (block 1612), the example instructions 1600 end and control returns to a calling function such as block 1508 of FIG. 15.

FIGS. 17A-17E collectively illustrate a flowchart representative of example machine readable instructions 1700 which may be executed to implement the example sensor adapter 112 of FIG. 1 to configure the WDR processor 104 and/or the controller 128 of FIG. 1 to generate a WDR image from input data from an input sensor 102. The example instructions 1700 of FIGS. 17A-17E may be executed to implement block 1508 of FIG. 15 after an architecture type of the image sensor 102 is converted to a WDR processing flow, such as one of the WDR processing flows 900-1400 of FIGS. 9-14. The instructions 1700 are described below with reference to the example ISP 100 of FIG. 1.

The example sensor adapter 112 of FIG. 1 determines whether the image sensor 102 implements a frame-interleaved WDR (e.g., multiple-frame with temporal diversity)

Figure 17A:
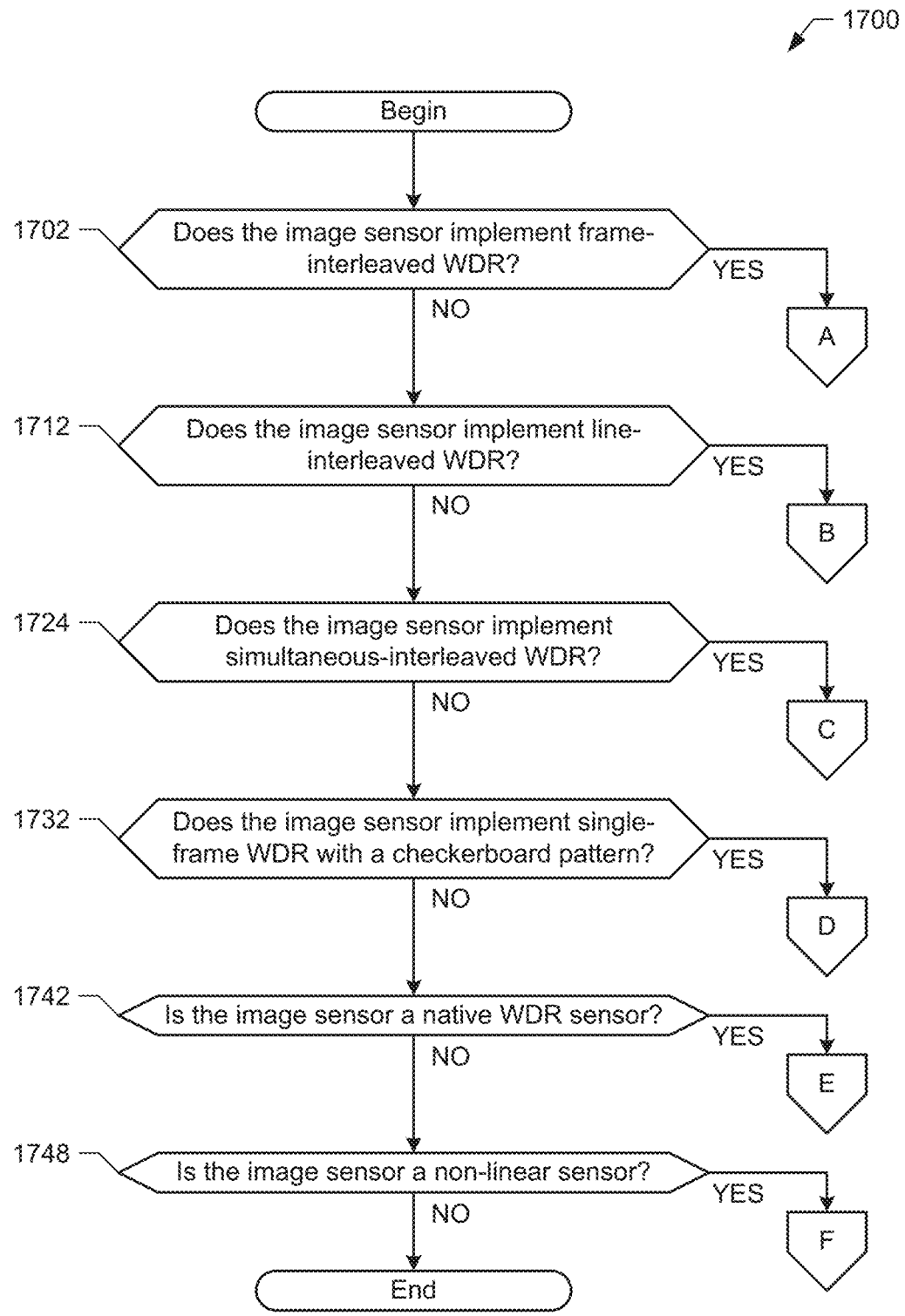
FIGS. 17A-17E collectively illustrate a flowchart representative of example machine readable instructions which may be executed to implement the example sensor adapter of FIG. 1 to configure the WDR processor and/or the controller of FIG. 1 to generate a WDR image from input data from an input sensor.
Figure 17B:
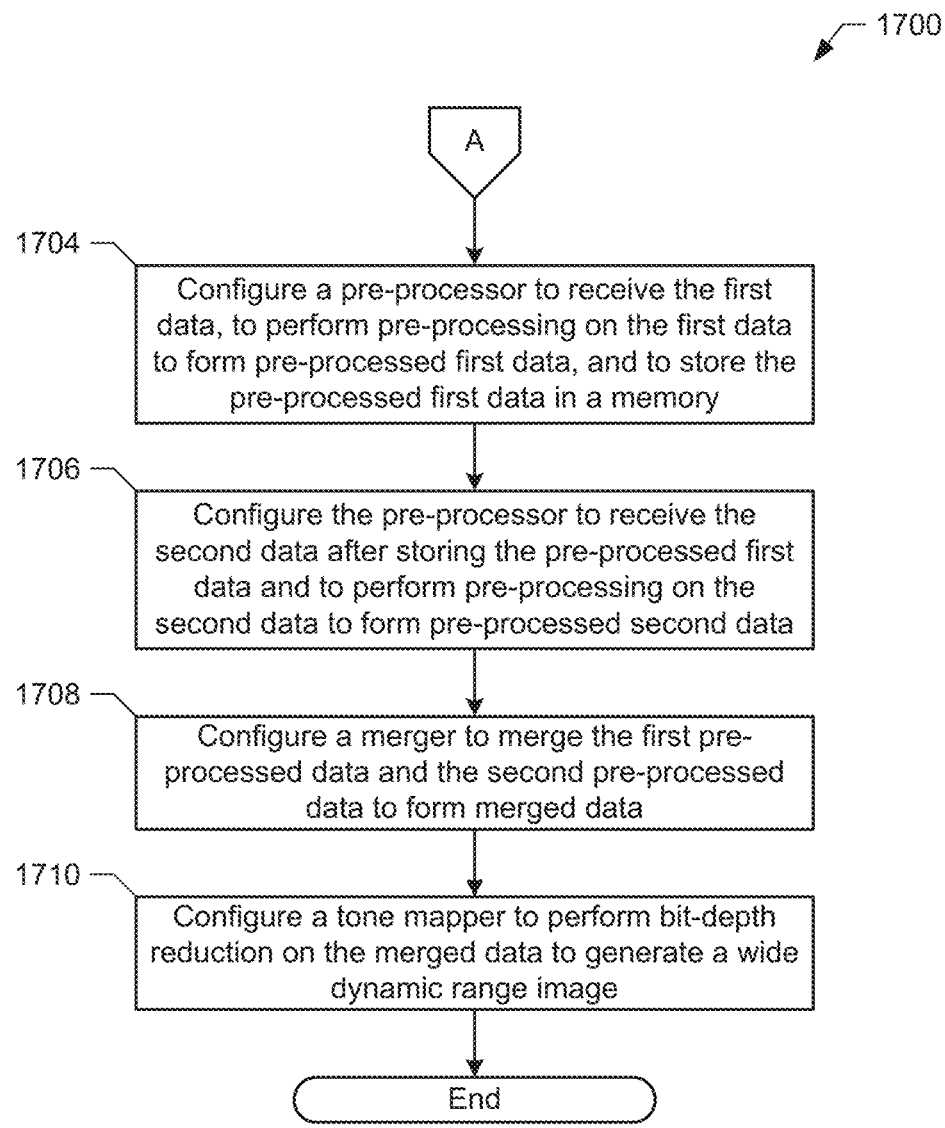

(block 1702). Turning to FIG. 17B, when the image sensor 102 implements a frame-interleaved WDR (e.g., multiple-frame with temporal diversity) (block 1702), the example sensor adapter 112 configures a pre-processor (e.g., the pre-processor 118 of FIG. 1) to receive first data, to perform pre-processing on the first data to form pre-processed first data, and to store the pre-processed first data in a memory (e.g., the memory 106 of FIG. 1) (block 1704). For example, the pre-processor 118 may be configured to perform pre-processing tasks on a first frame generated by a long exposure of the image sensor 102 to light, and stores the pre-processed first frame 906 of FIG. 9 in the memory 106. Block 1704 may be executed to configure the first sub-operation 902 of FIG. 9.

The example sensor adapter 112 configures the pre-processor 118 to receive second data (e.g., a second frame based on a short exposure of the image sensor 102 to light) after storing the pre-processed first data in the memory 106 and to perform pre-processing on the second data to form pre-processed second data (block 1706).

The sensor adapter 112 configures a merger (e.g., the merger 122 of FIG. 1) to merge the first pre-processed data and the second pre-processed data to form merged data (block 1708). For example, the merger 122 may be configured to merge the pre-processed second frame 910 with the pre-processed first frame 906 stored in the memory 106 during the first sub-operation 902 of FIG. 9.

The sensor adapter 112 configures a tone mapper (e.g., the tone mapper 124 of FIG. 1) to perform bit-depth reduction on the merged data to generate a WDR image (block 1710). For example, the tone mapper 124 may be configured to perform tone mapping on the merged image to downscale the merged image to a 12 bit-per-channel image. Blocks 1706-1710 may be executed to configure the second sub-operation 904 of FIG. 9.

Figure 17C:
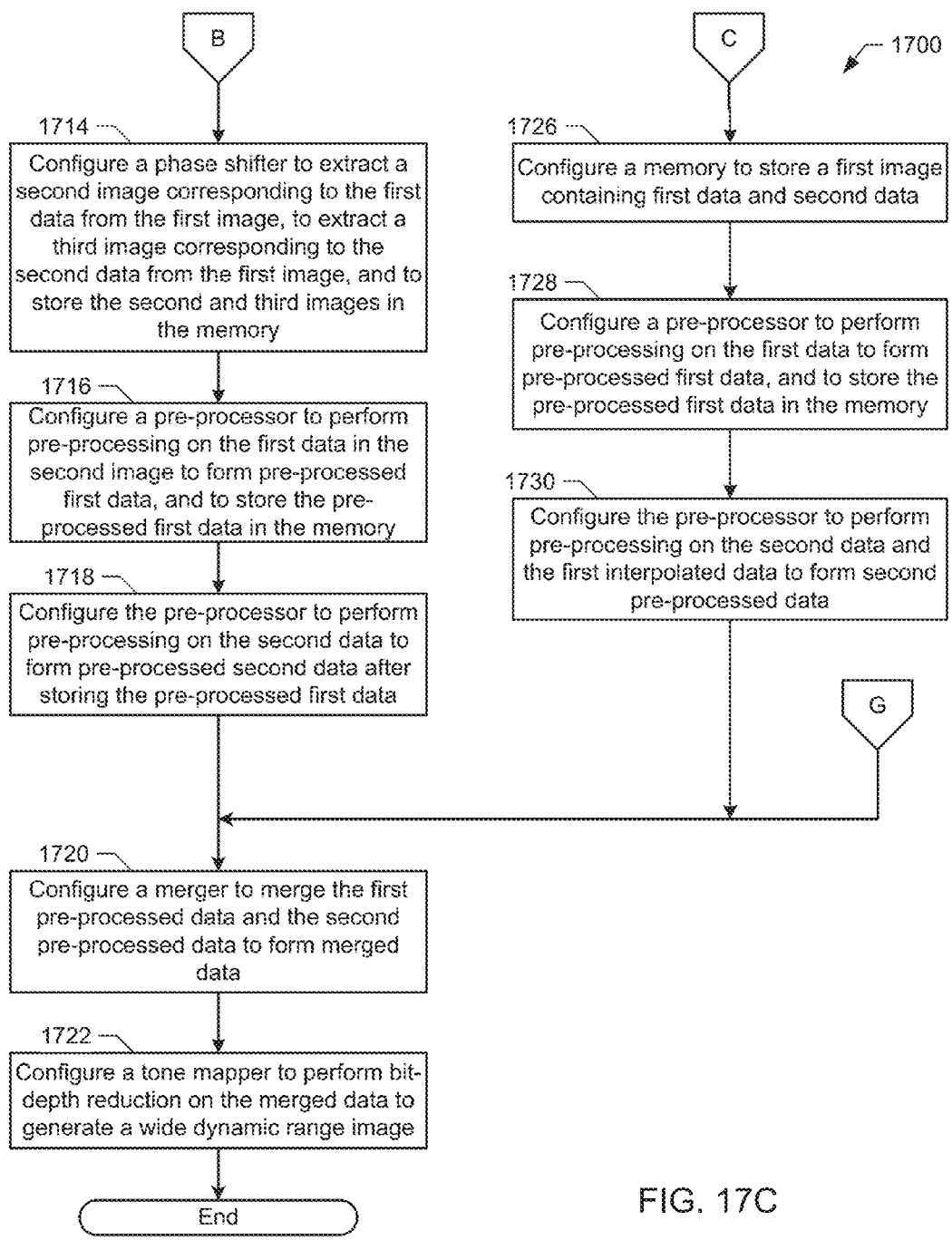

Returning to FIG. 17A, when the image sensor 102 does not implement a frame-interleaved WDR (e.g., multiple-frame with temporal diversity) (block 1702), the example sensor adapter 112 determines whether the image sensor 102 implements a line-interleaved WDR (e.g., multiple-frame with spatial diversity) (block 1712). Turning to FIG. 17C, when the image sensor 102 implements a line-interleaved WDR (block 1712), the example sensor adapter 112 configures the memory 106 to store a first image containing the first data and the second data, the first data and the second data being interleaved with each other (block 1714).

The example sensor adapter 112 configures a phase shifter (e.g., the phase shifter 120 of FIG. 1) to extract a second image corresponding to the first data from the first image, to extract a third image corresponding to the second data from the first image, and to store the second and third images in the memory (block 1714). For example, the phase shifter 120 may be configured to split the line-interleaved image into the long-exposure frame 1006 and the short-exposure frame 1008 of FIG. 10, and to store the frames 1006, 1008 in the memory 106. In some examples, the phase shifter 120 is configured to split line-interleaved image such that each of the frames 1006, 1008 has half the height (e.g., one half of the size in the vertical dimension) compared to the height of the captured image.

The example sensor adapter 112 configures the pre-processor 118 to perform pre-processing on the first data in the second image to form pre-processed first data, and to store the pre-processed first data in the memory (block 1716). For example, the pre-processor 118 may be configured to perform pre-processing (e.g., lens shading correction, correcting for defective pixels, etc.) on the long-exposure frame 1006 of FIG. 10 stored in the memory 106, and to store a pre-processed long-exposure frame 1010 in the memory 106. The example blocks 1714 and 1716 may be executed to configure the first sub-operation 1002 of FIG. 10 to execute the phase shifter 120 and the pre-processor 118.

The example sensor adapter 112 also configures the pre-processor 118 to perform pre-processing on the second data (e.g., the short-exposure frame 1008 of FIG. 10) to form pre-processed second data (e.g., the pre-processed short-exposure frame 1012) after storing the first pre-processed data (block 1718). For example, the pre-processor 118 may be configured to pre-process the short-exposure frame 1008 of FIG. 10 stored in the memory 106 to generate a pre-processed short-exposure frame 1012.

The example sensor adapter 112 configures the merger 122 to merge the first pre-processed data and the second pre-processed data to form merged data (block 1720). For example, the merger 122 may be configured to merge the pre-processed short-exposure frame 1012 with the pre-processed long-exposure frame 1010 stored in the memory 106 during the first sub-operation 1002 of FIG. 10.

The example sensor adapter 112 configures the tone mapper 124 to perform bit-depth reduction on the merged data to generate a wide dynamic range image (block 1722). For example, the tone mapper 124 may be configured to perform tone mapping on the merged image 1014 to downscale the merged image 1024 to a 12 bit-per-channel image. The example blocks 1718, 1720, and 1722 may be executed to configure the second sub-operation 1004 of FIG. 10 to execute the pre-processor 118, the merger 122, and the tone mapper 124.

Returning to FIG. 17A, when the image sensor 102 does not implement a line-interleaved WDR (block 1712), the example sensor adapter 112 determines whether the image sensor 102 implements simultaneous-interleaved WDR (e.g., multiple-frame with temporal and spatial diversity) (block 1724). Returning to FIG. 17B, when the image sensor 102 implements simultaneous-interleaved WDR (block 1724), the example sensor adapter 112 configures the memory 106 to store a first image containing first data and second data (block 1726). For example, the controller 128 may be configured to store the long exposure frame 1106 and the short-exposure 1108 in the memory 106 during the first sub-operation 1102 of FIG. 11.

The example sensor adapter 112 of FIG. 1 configures the pre-processor 118 to perform pre-processing on the first data to form pre-processed first data, and to store the pre-processed first data in the memory (block 1728). For example, the pre-processor 118 may be configured to perform pre-processing on the long-exposure frame 1106 to generate a pre-processed long exposure frame 1110. The example blocks 1726 and 1728 may be executed to configure the first sub-operation 1102 of FIG. 11 to execute the pre-processor 118.

The example sensor adapter 112 of FIG. 1 configures the pre-processor 118 to perform pre-processing on the second data and the first interpolated data to form second pre-processed data (block 1730). For example, the pre-processor 118 may be configured to pre-process the short-exposure frame 1108 stored in the memory 106 during the second sub-operation 1104 of FIG. 11 to generate a pre-processed short-exposure frame 1112. The example sensor adapter 112 then passes control to blocks 1720 and 1722 to configure the merger 122 and tone mapper 124 as described above. The example blocks 1730, 1720, and 1722 may be executed to configure the second sub-operation 1104 of FIG. 11 to execute the pre-processor 118, the merger 122, and the tone mapper 124.

Figure 17D:
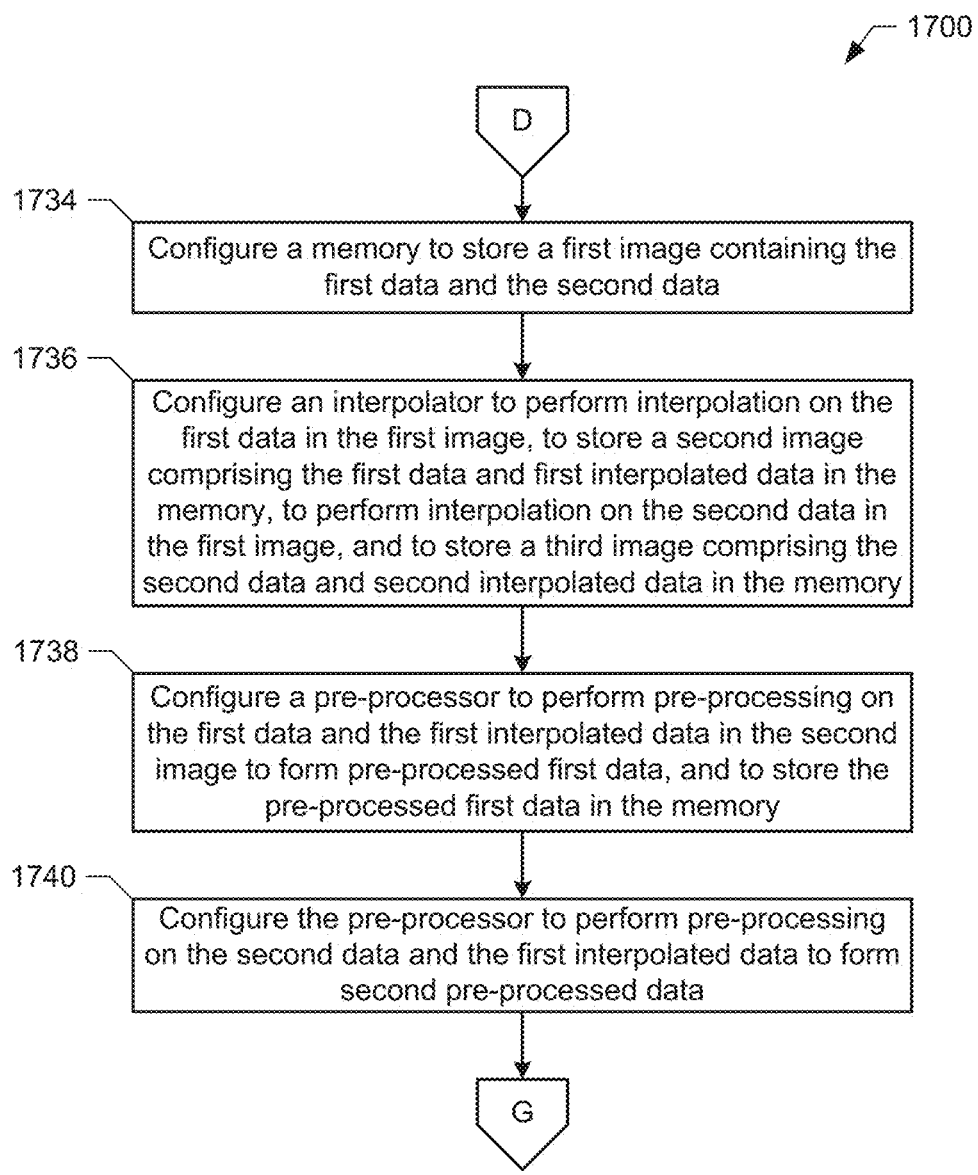

Returning to FIG. 17A, when the image sensor 102 does not implement a simultaneous-interleaved WDR (block 1724), the example sensor adapter 112 determines whether the image sensor 102 implements single-frame WDR with a checkerboard pattern (block 1732). Turning to FIG. 17D, when the image sensor 102 implements single-frame WDR with a checkerboard pattern (block 1732), the example sensor adapter 112 of FIG. 1 configures the memory 106 to store a first image containing the first data and the second data (block 1734).

The sensor adapter 112 of FIG. 1 configures an interpolator (e.g., the interpolator 114 of FIG. 1) to perform interpolation on the first data in the first image, to store a second image comprising the first data and first interpolated data in the memory 106, to perform interpolation on the second data in the first image, and to store a third image that includes the second data and second interpolated data in the memory (block 1736). For example, the interpolator 114 of FIG. 1 may be configured to generate the long-exposure frame 1210 by interpolating between high-sensitivity pixels in the full frame image 1208 and stores the long-exposure frame 1210 in the memory 106. The example interpolator 114 may also be configured to generates a short-exposure frame 1212 by interpolating between low-sensitivity pixels in the full frame image 1208 and stores the short-exposure frame 1212 in the memory 106. The example block 1736 may be executed to configure the first sub-operation 1202 of FIG. 12 to execute the interpolator 114.

The sensor adapter 112 of FIG. 1 configures the pre-processor 118 to perform pre-processing on the first data and the first interpolated data in the second image to form first pre-processed data, and to store the pre-processed first data in the memory (block 1738). For example, the pre-processor 118 may be configured to perform pre-processing on the long-exposure frame 1210 to generate a pre-processed long exposure frame 1214. The example block 1738 may be executed to configure the first sub-operation 1204 of FIG. 12 to execute the pre-processor 118.

The sensor adapter 112 of FIG. 1 configures the pre-processor to perform pre-processing on the second data and the first interpolated data to form second pre-processed data (block 1740). For example, the example pre-processor 118 may be configured to perform pre-processing the short-exposure frame 1212 stored in the memory 106 to generate a pre-processed short-exposure frame 1216 in the third sub-operation 1206 of FIG. 12. The example sensor adapter 112 then passes control to blocks 1720 and 1722 of FIG. 17C to configure the merger 122 and tone mapper 124 as described above. The example blocks 1740, 1720, and 1722 may be executed to configure the third sub-operation 1206 of FIG. 12 to execute the pre-processor 118, the merger 122, the tone mapper 124, and the post-processor 126.

Figure 17E:
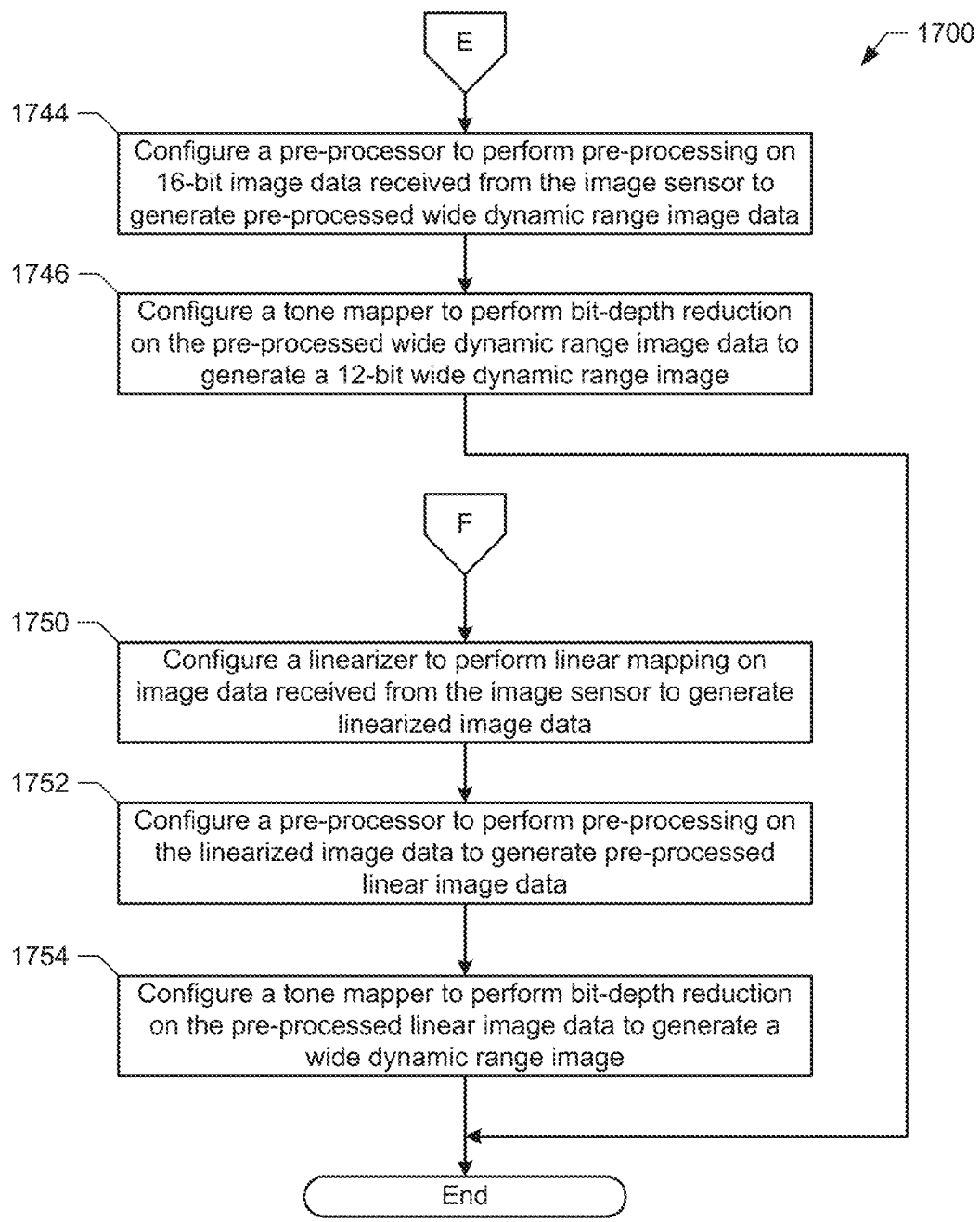

When the image sensor 102 does not implement single-frame WDR with a checkerboard pattern (block 1732), the example sensor adapter 112 determines whether the image sensor 102 is a native WDR sensor (block 1742). Turning to FIG. 17E, when the image sensor 102 is a native WDR sensor (block 1742), the sensor adapter 112 configures the pre-processor 118 to perform pre-processing on 16-bit image data received from the image sensor 102 to generate pre-processed WDR image data (block 1744).

The example sensor adapter 112 configures the tone mapper 124 to perform bit-depth reduction on the pre-processed WDR image data to generate a 12-bit WDR image (block 1746). For example, the tone mapper 124 may be configured to perform tone mapping on the pre-processed image 1304 as shown in the WDR processing flow of FIG. 13 to downscale the pre-processed 16-bit image 1304 to a 12 bit-per-channel tone-mapped image 1306.

Returning to FIG. 17A, when the image sensor 102 is not a native WDR sensor (block 1742), the example sensor adapter 112 determines whether the image sensor 102 is a non-linear sensor (block 1748). When the image sensor 102 is a non-linear sensor (block 1748), the example sensor adapter 112 configures a linearizer (e.g., the linearizer 116 of FIG. 1) to perform linear mapping on image data received from the image sensor to generate linearized image data (block 1750). For example, the linearizer 116 may be configured to converts the non-linear image to a linear image 1404 in the single operation 1402 of FIG. 14 by performing linear mapping, decompanding, and/or any other linearization technique.

The example sensor adapter 112 configures the pre-processor 118 to perform pre-processing on the linearized image data to generate pre-processed linear image data (block 1752). For example, the pre-processor 118 may be configured to pre-process the linear image 1404 (e.g., lens shading correction, correcting for defective pixels, etc.) to generate a pre-processed linear image 1406. Because the pre-processed linear image 1406 is already a WDR image, the example sensor adapter 112 configures the WDR processor 104 to bypass the merger 122 and provides the pre-processed linear image 1406 to the tone mapper 124 as shown in the WDR processing flow of FIG. 14.

The example sensor adapter 112 configures the tone mapper 124 to perform bit-depth reduction on the pre-processed linear image data to generate a wide dynamic range image (block 1754). For example, the tone mapper 124 may be configured to perform tone mapping on the pre-processed linear image 1404 to downscale the pre-processed linear image to a 12 bit-per-channel image.

When the image sensor 102 is not a non-linear sensor (block 1748), the example instructions 1700 end (e.g., without configuring the ISP 100). Alternatively, the example instructions 1700 end after configuring the tone mapper 124 to perform bit-depth reduction in blocks 1710, 1722, 1746, or 1754.

In some examples, the instructions 1700 further include configuring the post-processor 126 to perform desired post-processing operations prior to ending the instructions 1700 and/or storing the final image in the memory 106 for subsequent use. Control returns to a calling function, such as block 1508 of FIG. 15.

Figure 18:
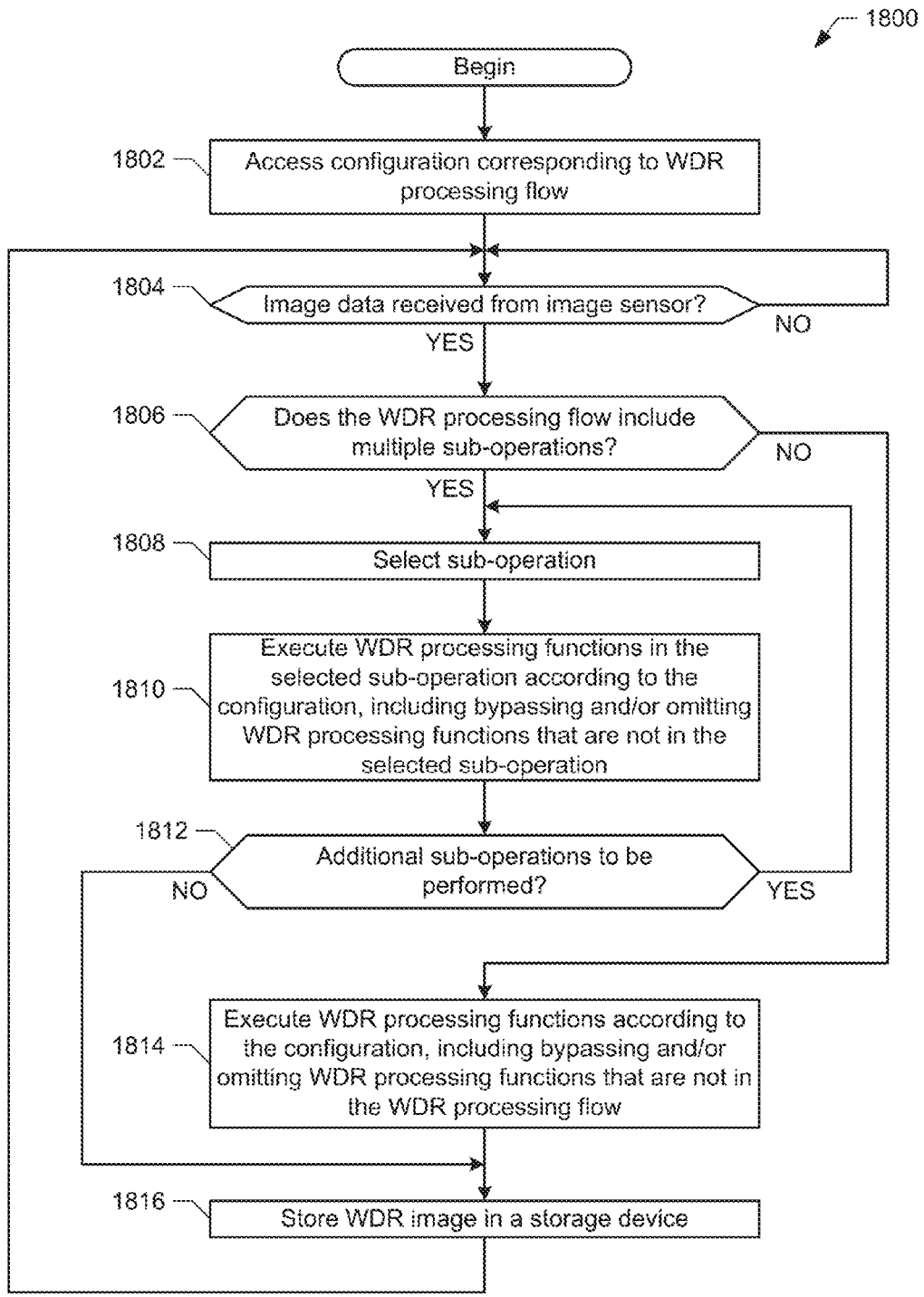
FIG. 18 is a flowchart representative of example machine readable instructions which may be executed to implement the example controller of FIG. 1 to control a WDR processing flow based on a configuration of the controller and/or a configuration of the example WDR processing blocks of FIG. 1.

FIG. 18 illustrates a flowchart representative of example machine readable instructions 1800 which may be executed to implement the example controller 128 of FIG. 1 to control a WDR processing flow based on a configuration of the controller 128 and/or a configuration of the example WDR processing blocks 114-126 of FIG. 1. The example instructions 1800 of FIG. 18 are performed after configuration of the ISP 100 of FIG. 1 by the example sensor adapter 112 and/or during use of a device including the ISP 100.

The example controller 128 of FIG. 1 accesses a configuration corresponding to a WDR processing flow (block 1802). For example, the configuration may be stored in a storage device or memory and accessed by the controller 128 at a startup of the ISP 100. The configuration corresponds to an architecture type and/or a WDR technique used by the image sensor 102 to which the ISP 100 is connected.

The example controller 128 determines whether image data has been received from the image sensor (block 1804).

For example, the controller 128 may determine whether there is data in an image input buffer and/or the ISP 100 may receive an interrupt signal to cause the ISP 100 to process image data. When image data has not been received (block 1804), block 1804 iterates until image data is received.

When image data has been received (block 1804), the example controller 128 determines whether the WDR processing flow includes multiple sub-operations (e.g., based on the accessed configuration) (block 1806). For example, some WDR processing flows may include multiple sub-operations (e.g., the WDR processing flows discussed with reference to FIGS. 9-12, where one or more of the WDR processing blocks 114-126 is used more than once). Each of the sub-operations may include a subset of one or more of the WDR processing blocks 114-126 of FIG. 1. Different ones of the sub-operations may include the same, different, and/or overlapping subsets of the WDR processing functions.

When the WDR processing flow includes multiple sub-operations (block 1806), the example controller 128 selects a sub-operation (block 1808) and executes the WDR processing blocks 114-126 in the selected sub-operation according to the configuration (block 1810). Executing the WDR processing blocks 114-126 in the selected sub-operation includes bypassing and/or omitting ones of the WDR processing blocks 114-126 that are not in the selected sub-operation. After executing the WDR processing blocks in the selected sub-operation (block 1810), the controller 128 determines whether there are additional sub-operations to be performed (block 1812). When there are additional sub-operations to be performed (block 1812), control returns to block 1808 to select a next sub-operation.

When the WDR processing flow does not include multiple sub-operations (e.g., none of the WDR processing blocks is performed more than once) (block 1806), the example controller 128 executes the WDR processing blocks according to the configuration (block 1814). Executing the WDR processing blocks 114-126 in block 1814 includes bypassing and/or omitting ones of the WDR processing blocks 114-126 that are not in the WDR processing flow.

When there are no more sub-operations to be performed (block 1812) or after executing the WDR processing blocks (block 1814), the example controller 128 stores (or controls one of the WDR processing blocks 114-126 to store) a WDR image in a storage device (block 1816). Control then returns to block 1804 to await further image data.

Figure 19:
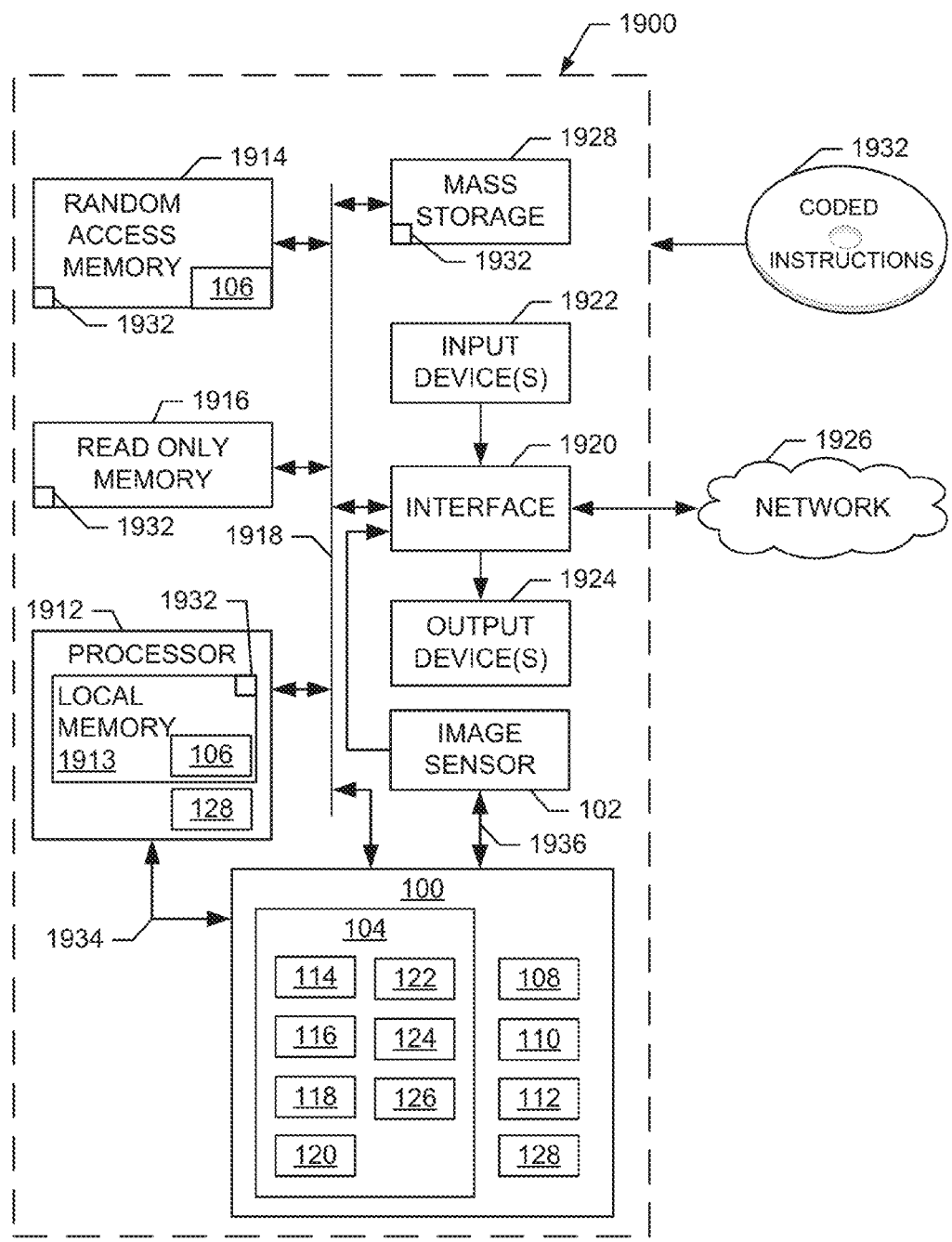
FIG. 19 is a block diagram of an example processor platform structured to execute the instructions of FIGS. 15, 16, 17A-17E, and/or 18 to implement the example WDR processing blocks, the example memory, the example architecture recognizer, the example function selector, the example sensor adapter, and/or the example controller of FIGS. 1, 9, 10, 11, 12, 13, and/or 14.

FIG. 19 is a block diagram of an example processor platform 1900 structured to execute the instructions of FIGS. 15, 16, 17A-17E, and/or 18 to implement the example WDR processor 104, the example memory 106, the example architecture recognizer 108, the example function selector 110, the example sensor adapter 112, the example interpolator 114, the example linearizer 116, the example pre-processor 118, the example phase shifter 120, the example merger 122, the example tone mapper 124, the example post-processor 126, and/or the example controller 128 of FIG. 1. The processor platform 1900 can be, for example, a personal computer, a mobile device (e.g., a cell phone, a smart phone, a tablet such as an iPad™), a personal digital assistant (PDA), or any other type of computing device capable of processing images.

The example processor platform 1900 of FIG. 19 includes the ISP 100 of FIG. 1. The ISP 100 of the example shown in FIG. 19 is an independent hardware processor, such as a separate integrated circuit, and includes the example WDR processor 104, the example architecture recognizer 108, the example function selector 110, the example sensor adapter 112, the example interpolator 114, the example linearizer 116, the example pre-processor 118, the example phase shifter 120, the example merger 122, the example tone mapper 124, the example post-processor 126, and/or the example controller 128 of FIG. 1.

The processor platform 1900 of the illustrated example includes a second processor 1912. The processor 1912 of the illustrated example is hardware. For example, the processor 1912 can be implemented by one or more integrated circuits, logic circuits, microprocessors or controllers from any desired family or manufacturer. The example processor 1912 of FIG. 19 may implement the example controller 128 of FIG. 1 to, for example, control the flow of data between ones of a subset of the selected WDR processing blocks 114-126 in the ISP 100. In some examples, the ISP 100 may be integrated with the processor 1912. For example, the ISP 100 may include the processor 1912 to implement the controller 128 and/or the ISP 100 may be integrated into the same integrated circuit package as the processor 1912 (e.g., in a system-on-a-chip integrated circuit).

The processor 1912 of the illustrated example includes a local memory 1913 (e.g., a cache). The processor 1912 of the illustrated example is in communication with a main memory including a volatile memory 1914 and a non-volatile memory 1916 via a bus 1918. The volatile memory 1914 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1916 may be implemented by flash memory and/or any other desired type of memory device. Access to the main memory 1914, 1916 is controlled by a memory controller. The example local memory 1913 and/or the example random access memory 1914 may implement the memory 106 of FIG. 1.

The processor platform 1900 of the illustrated example also includes an interface circuit 1920. The interface circuit 1920 may be implemented by any type of interface standard, such as an Ethernet interface, a universal serial bus (USB), and/or a PCI express interface.

In the illustrated example, one or more input devices 1922 are connected to the interface circuit 1920. The input device(s) 1922 permit(s) a user to enter data and commands into the processor 1912. The input device(s) can be implemented by, for example, an audio sensor, a microphone, a camera (still or video), a keyboard, a button, a mouse, a touchscreen, a track-pad, a trackball, isopoint and/or a voice recognition system. The example image sensor 102 of FIG. 1 may also be in communication with the interface 1920 to provide image data.

One or more output devices 1924 are also connected to the interface circuit 1920 of the illustrated example. The output devices 1924 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 1920 of the illustrated example, thus, typically includes a graphics driver card, a graphics driver chip or a graphics driver processor.

The interface circuit 1920 of the illustrated example also includes a communication device such as a transmitter, a receiver, a transceiver, a modem and/or network interface card to facilitate exchange of data with external machines (e.g., computing devices of any kind) via a network 1926

(e.g., an Ethernet connection, a digital subscriber line (DSL), a telephone line, coaxial cable, a cellular telephone system, etc.).

The processor platform 1900 of the illustrated example also includes one or more mass storage devices 1928 for storing software and/or data. Examples of such mass storage devices 1928 include floppy disk drives, hard drive disks, compact disk drives, Blu-ray disk drives, RAID systems, and digital versatile disk (DVD) drives.

The coded instructions 1932 of FIGS. 15, 16, 17A-17E, and/or 18 may be stored in the mass storage device 1928, in the volatile memory 1914, in the non-volatile memory 1916, and/or on a removable tangible computer readable storage medium such as a CD or DVD.

The example ISP 100 may communicate with the processor 1012 via a direct data connection 1934 and/or via the bus 1918. Similarly, the example ISP 100 may communicate with the image sensor 102 via a direct data connection 1936 and/or via the interface 1920 and the bus 1918. In some other examples, the ISP 100 and/or the processor 1012 may retrieve image data stored in the memory 106 (e.g., in the local memory 1913 and/or in the RAM 1914) by the image sensor 102.

Figure 20:
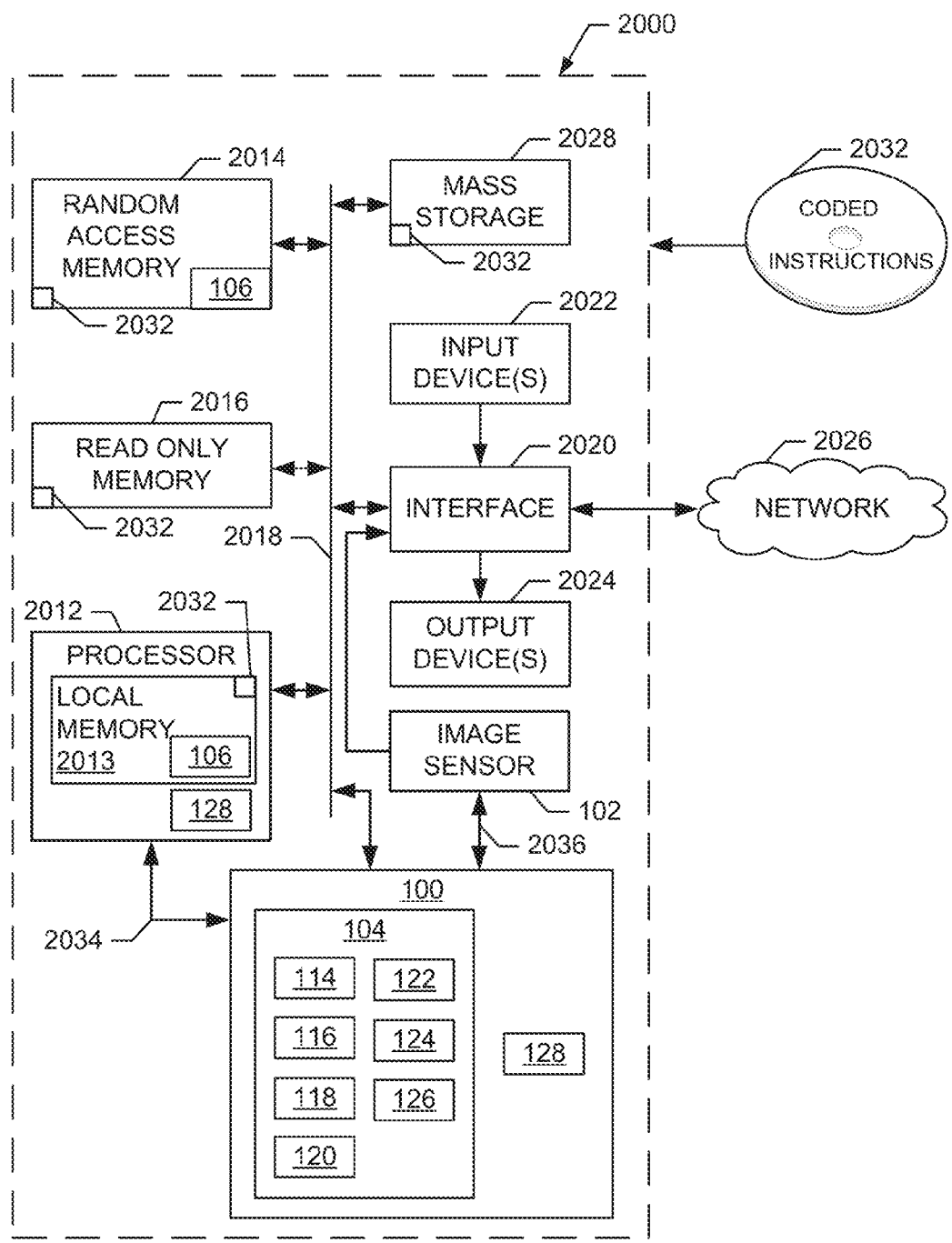
FIG. 20 is a block diagram of an example processor platform structured to execute the instructions of FIG. 18 to implement the example WDR processing blocks and/or the example controller of FIGS. 1, 9, 10, 11, 12, 13, and/or 14.

FIG. 20 is a block diagram of an example processor platform 2000 structured to execute the instructions of FIG. 18 to implement the example WDR processor 104, the example interpolator 114, the example linearizer 116, the example pre-processor 118, the example phase shifter 120, the example merger 122, the example tone mapper 124, the example post-processor 126, and/or the example controller 128 of FIG. 1. The processor platform 2000 can be, for example, a personal computer, a mobile device (e.g., a cell phone, a smart phone, a tablet such as an iPad™), a personal digital assistant (PDA), or any other type of computing device capable of processing images. The example processor platform 2000 generates WDR images based on a configuration of the example WDR processor 104, the example interpolator 114, the example linearizer 116, the example pre-processor 118, the example phase shifter 120, the example merger 122, the example tone mapper 124, the example post-processor 126, and/or the example controller 128. The example processor platform 2000 of FIG. 20 differs from the example processor platform 1900 of FIG. 19 in that the processor platform 2000 does not include the architecture recognizer 108, the function selector 110, or the sensor adapter 112. Instead, the WDR processing blocks 114-126 and/or the controller 128 of FIG. 20 must be configured using an external device (e.g., that may include the architecture recognizer 108, the function selector 110, or the sensor adapter 112).

The example processor platform 2000 of FIG. 20 includes the ISP 100 of FIG. 1. The ISP 100 of the example shown in FIG. 20 is an independent hardware processor, such as a separate integrated circuit, and includes the example WDR processor 104, the example interpolator 114, the example linearizer 116, the example pre-processor 118, the example phase shifter 120, the example merger 122, the example tone mapper 124, the example post-processor 126, and/or the example controller 128 of FIG. 1.

The processor platform 2000 of the illustrated example includes a processor 2012. The processor 2012 of the illustrated example is hardware. For example, the processor 2012 can be implemented by one or more integrated circuits, logic circuits, microprocessors or controllers from any desired family or manufacturer. The example processor 2012 of FIG. 20 may implement the example controller 128 of FIG. 1 to, for example, control the flow of data between ones of a subset of the selected WDR processing blocks 114-126 in the ISP 100. In some examples, the ISP 100 may be integrated with the processor 2012. For example, the ISP 100 may include the processor 2012 to implement the controller 128 and/or the ISP 100 may be integrated into the same integrated circuit package as the processor 2012 (e.g., in a system-on-a-chip integrated circuit).

The processor 2012 of the illustrated example includes a local memory 2013 (e.g., a cache). The processor 2012 of the illustrated example is in communication with a main memory including a volatile memory 2014 and a non-volatile memory 2016 via a bus 2018. The volatile memory 2014 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 2016 may be implemented by flash memory and/or any other desired type of memory device. Access to the main memory 2014, 2016 is controlled by a memory controller. The example local memory 2013 and/or the example random access memory 2014 may implement the memory 106 of FIG. 1.

The processor platform 2000 of the illustrated example also includes an interface circuit 2020. The interface circuit 2020 may be implemented by any type of interface standard, such as an Ethernet interface, a universal serial bus (USB), and/or a PCI express interface.

In the illustrated example, one or more input devices 2022 are connected to the interface circuit 2020. The input device(s) 2022 permit(s) a user to enter data and commands into the processor 2012. The input device(s) can be implemented by, for example, an audio sensor, a microphone, a camera (still or video), a keyboard, a button, a mouse, a touchscreen, a track-pad, a trackball, isopoint and/or a voice recognition system. The example image sensor 102 of FIG. 1 may also be in communication with the interface 2020 to provide image data.

One or more output devices 2024 are also connected to the interface circuit 2020 of the illustrated example. The output devices 2024 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 2020 of the illustrated example, thus, typically includes a graphics driver card, a graphics driver chip or a graphics driver processor.

The interface circuit 2020 of the illustrated example also includes a communication device such as a transmitter, a receiver, a transceiver, a modem and/or network interface card to facilitate exchange of data with external machines (e.g., computing devices of any kind) via a network 2026 (e.g., an Ethernet connection, a digital subscriber line (DSL), a telephone line, coaxial cable, a cellular telephone system, etc.).

The processor platform 2000 of the illustrated example also includes one or more mass storage devices 2028 for storing software and/or data. Examples of such mass storage devices 2028 include floppy disk drives, hard drive disks, compact disk drives, Blu-ray disk drives, RAID systems, and digital versatile disk (DVD) drives.

The coded instructions 2032 of FIG. 18 may be stored in the mass storage device 2028, in the volatile memory 2014, in the non-volatile memory 2016, and/or on a removable tangible computer readable storage medium such as a CD or DVD.

The example ISP 100 may communicate with the processor 1012 via a direct data connection 1934 and/or via the bus 1918. Similarly, the example ISP 100 may communicate with the image sensor 102 via a direct data connection 1936 and/or via the interface 1920 and the bus 1918. In some other examples, the ISP 100 and/or the processor 1012 may retrieve image data stored in the memory 106 (e.g., in the local memory 1913 and/or in the RAM 1914) by the image sensor 102.

Figure 21:
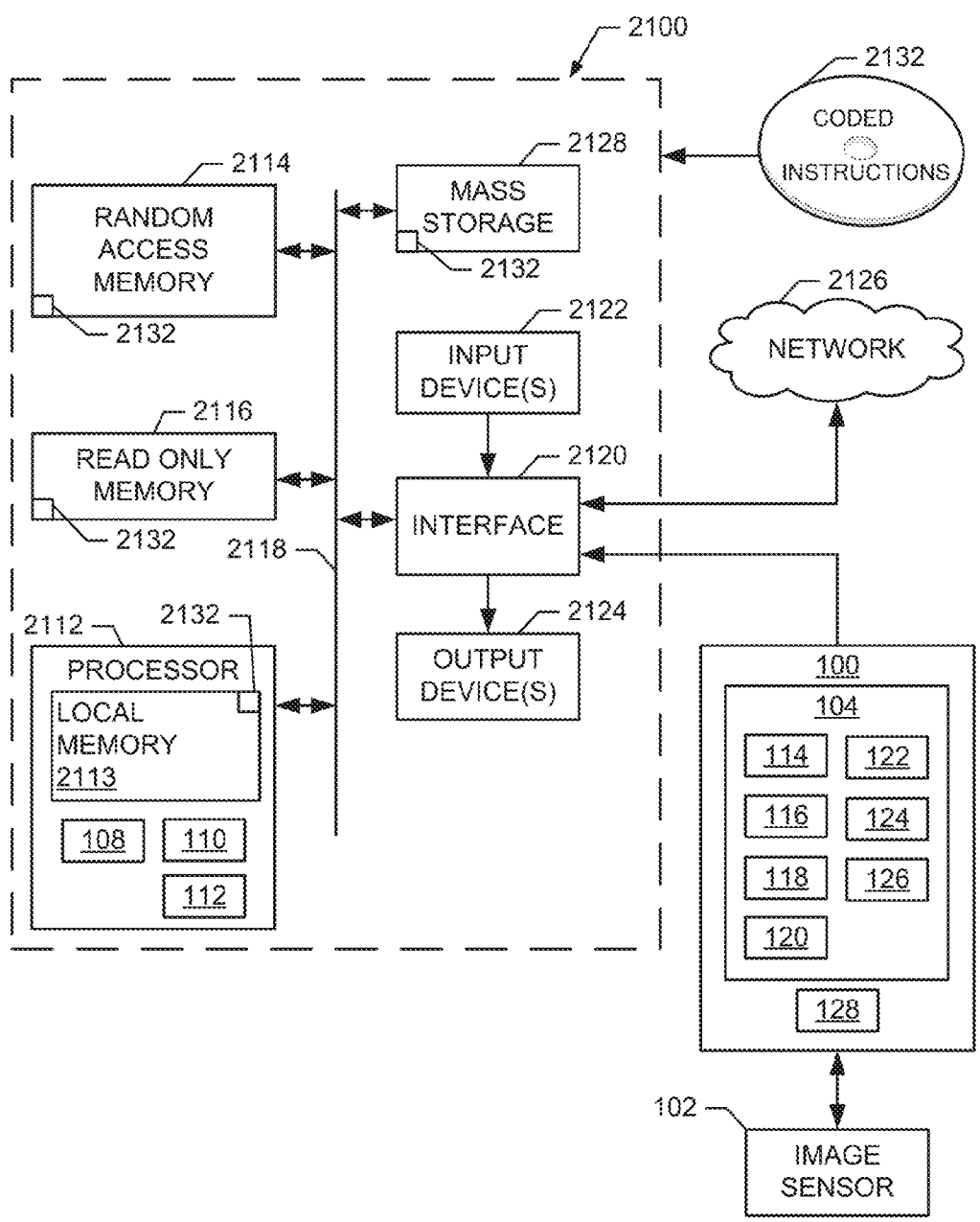
FIG. 21 is a block diagram of an example processor platform 2100 structured to execute the instructions of FIGS. 15, 16, and/or 17A-17E to implement the example architecture recognizer, the example function selector, and/ or the example sensor adapter of FIG. 1.

FIG. 21 is a block diagram of an example processor platform 2100 structured to execute the instructions of FIGS. 15, 16, and/or 17A-17E to implement the example architecture recognizer 108, the example function selector 110, and/or the example sensor adapter 112 of FIG. 1. The processor platform 2100 can be, for example, a personal computer, a mobile device (e.g., a cell phone, a smart phone, a tablet such as an iPad™), a personal digital assistant (PDA), or any other type of computing device capable of configuring an ISP (e.g., via an appropriate interface). The example processor platform 2100 of FIG. 21 differs from the example processor platforms 1900, 2000 of FIGS. 19 and 20 in that the processor platform 2100 does not include the WDR processor 104, the example interpolator 114, the example linearizer 116, the example pre-processor 118, the example phase shifter 120, the example merger 122, the example tone mapper 124, the example post-processor 126, or the example controller 128. Instead, the processor platform 2100 of FIG. 21 provides architecture recognition and/or ISP configuration services to configure ISPs to implement WDR processing flows based on identifying an architecture type and/or a WDR processing technique used by an image sensors connected the ISPs.

The processor platform 2100 of the illustrated example includes a processor 2112. The processor 2112 of the illustrated example is hardware. For example, the processor 2112 can be implemented by one or more integrated circuits, logic circuits, microprocessors or controllers from any desired family or manufacturer. The example processor 2112 of FIG. 21 may implement the example architecture recognizer 108, the example function selector 110, and the example sensor adapter 112 of FIG. 1 to configure an ISP 100 based on an architecture type and/or a WDR technique of an image sensor 102.

The processor 2112 of the illustrated example includes a local memory 2113 (e.g., a cache). The processor 2112 of the illustrated example is in communication with a main memory including a volatile memory 2114 and a non-volatile memory 2116 via a bus 2118. The volatile memory 2114 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 2116 may be implemented by flash memory and/or any other desired type of memory device. Access to the main memory 2114, 2116 is controlled by a memory controller. The example local memory 2113 and/or the example random access memory 2114 may implement the memory 106 of FIG. 1.

The processor platform 2100 of the illustrated example also includes an interface circuit 2120. The interface circuit 2120 may be implemented by any type of interface standard, such as an Ethernet interface, a universal serial bus (USB), and/or a PCI express interface. The example interface circuit 2120 connects the example processor platform 2100 to the ISP 100, which may in turn be connected to an image sensor 102, to enable the architecture recognizer 108 to recognize an architecture type and/or a WDR technique implemented by the image sensor 102 and/or to enable the sensor adapter 112 to configure the ISP 100 to implement a WDR processing flow using the WDR processing blocks 114-126.

In the illustrated example, one or more input devices 2122 are connected to the interface circuit 2120. The input device(s) 2122 permit(s) a user to enter data and commands into the processor 2112. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 2124 are also connected to the interface circuit 2120 of the illustrated example. The output devices 2124 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 2120 of the illustrated example, thus, typically includes a graphics driver card, a graphics driver chip or a graphics driver processor.

The interface circuit 2120 of the illustrated example also includes a communication device such as a transmitter, a receiver, a transceiver, a modem and/or network interface card to facilitate exchange of data with external machines (e.g., computing devices of any kind) via a network 2126 (e.g., an Ethernet connection, a digital subscriber line (DSL), a telephone line, coaxial cable, a cellular telephone system, etc.).

The processor platform 2100 of the illustrated example also includes one or more mass storage devices 2128 for storing software and/or data. Examples of such mass storage devices 2128 include floppy disk drives, hard drive disks, compact disk drives, Blu-ray disk drives, RAID systems, and digital versatile disk (DVD) drives.

The coded instructions 2132 of FIGS. 15, 16, and/or 17A-17E may be stored in the mass storage device 2128, in the volatile memory 2114, in the non-volatile memory 2116, and/or on a removable tangible computer readable storage medium such as a CD or DVD.

Examples disclosed herein enable flexibility in using the same integrated circuit to process image data collected from any of multiple different WDR techniques with any of multiple different image sensors, while also enabling greater efficiencies in circuit design. In particular, examples disclosed herein preserve silicon area on a semiconductor logic circuit by a factor of up to N, where N is equal to the number of WDR techniques supported, by re-using circuitry to perform WDR processing instead of including multiple copies of circuits to perform the same functions.

Examples disclosed herein also enable support for legacy image sensors that support 12 bit-per-channel bit depth in addition to supporting image sensors that have increased bit-depth of 16 bit-per-channel bit depth. This additional support is capable of saving silicon area on a semiconductor logic circuit by as much as 33% by avoiding having multiple circuits that each perform the same function on image data, but operate using different bit depths. As such, examples disclosed herein enable efficiencies in the energy required to operate image signal processors and promote efficiencies in semiconductor circuit fabrication and/or manufacturing by reducing the number of circuit designs that must be designed, validated, and/or tooled for fabrication to support the same variety of image sensors.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An image signal processor, comprising:
a first wide dynamic range processing block having a first input, a second input to receive input data from an image sensor, and a first output;
a second wide dynamic range processing block having a third input, a fourth input to receive input data from the image sensor, and a second output, at least one of the first and second outputs to output a wide dynamic range image based on at least two of the first, second, third and fourth inputs;
an architecture recognizer having a fifth input and a third output, the third output to convey an architecture type of the image sensor;
a function selector having a sixth input coupled to the third output of the architecture recognizer, the function selector having a fourth output to identify at least one of the first and second wide dynamic range processing blocks based on the third output; and
a sensor adapter having a seventh input coupled to the fourth output of the function selector, the sensor adapter having a fifth output coupled to the first input of the first wide dynamic range processing block and to the third input of the second wide dynamic range processing block.

2. An image signal processor as defined in claim 1, in which the fifth output is to configure at least one of the first and second wide dynamic range processing blocks to generate the wide dynamic range image.

3. An image signal processor as defined in claim 1, in which the architecture recognizer has a sixth output to couple to the image sensor to control the image sensor to capture image data, and the fifth input of the architecture recognizer is to couple to the image sensor to receive the image data to enable determination of a wide dynamic range imaging technique used to produce the image data.

4. An image signal processor as defined in claim 1, in which the architecture recognizer has a sixth output coupled to a storage device, the fifth input of the architecture recognizer to obtain an encoded identifier representing at least one of the image sensor or the architecture type.

5. An image signal processor as defined in claim 1, including a controller having an eight input coupled to the sensor adapter, the controller having a sixth output coupled to the first wide dynamic range processing block and a seventh output coupled to the second wide dynamic range processing block.

6. An image signal processor as defined in claim 1, in which the sensor adapter is to configure the at least one of the first and second wide dynamic range processing blocks execute more than once to output the wide dynamic range image.

7. An image signal processor as defined in claim 5, in which the sixth and seventh outputs of the controller are to control transfer of data between the first and second wide dynamic range processing blocks.

8. An image signal processor as defined in claim 1, including:
an interpolator having an eighth input including first pixels captured by an image sensor and having a sixth output including second pixels based on interpolating the first pixels;
a linearizer having a ninth input coupled to the image sensor and having a seventh output to output linearized image data;
a pre-processor having a tenth input to receive image data and having an eighth output to output pre-processed image data that has undergone at least one of noise filtering, pixel correction, or lens shading;
a phase shifter having an eleventh input coupled to the image sensor and having a ninth output to output de-interleaved pixel data;
a merger having a twelfth input to receive a first image frame and a thirteenth input to receive a second image frame, and having a tenth output to output a merged image; and
a tone mapper having a fourteenth input to receive a wide dynamic range image having a first bit depth and having an eleventh output to output the wide dynamic range image having a second bit depth that is less than the first bit depth, the fourth output of the function selector to identify at least one of the interpolator, the linearizer, the phase shifter, the merger, or the tone mapper.

9. A method to configure an image signal processor, the method comprising:
determining an architecture type of an image sensor;
selecting a subset of wide dynamic range processing blocks of an image signal processor to execute a wide dynamic range processing flow based on the architecture type of the image sensor; and
configuring the subset of the wide dynamic range processing blocks to generate a wide dynamic range image from input data from the image sensor;
in which the determining an architecture type of the image sensor includes accessing a storage device to obtain an encoded identifier representing at least one of the image sensor or the architecture type.

10. A method as defined in claim 9, in which at least one of the wide dynamic range processing blocks is implemented using a dedicated circuit.

11. A method as defined in claim 10, in which at least one of the wide dynamic range processing blocks is software.

12. A method as defined in claim 9, in which configuring the subset of the wide dynamic range processing blocks includes selecting the wide dynamic range processing flow to include a set of sub-operations, and configuring the subset of the wide dynamic range processing blocks includes configuring a first one of the sub-operations to implement a selected one of the wide dynamic range processing blocks.

13. A method as defined in claim 12, including configuring a controller to control transfer of data between the wide dynamic range processing blocks in the subset according to the wide dynamic range processing flow.

14. A method as defined in claim 12, including configuring a controller to control execution of the subset of the wide dynamic range processing blocks according to the wide dynamic range processing flow.

15. A method as defined in claim 9, in which determining the architecture type of the image sensor includes controlling the image sensor to capture image data and analyzing the image data to determine a wide dynamic range imaging technique corresponding to the image data.

16. A method as defined in claim 9, further including configuring a controller to bypass ones of the wide dynamic range processing blocks that are not in the subset of the wide dynamic range processing blocks to execute the wide dynamic range processing flow.

17. A method as defined in claim 9, in which determining the architecture type of the image sensor includes determining the architecture type to be one of line-interleaved, frame-interleaved, simultaneous-interleaved, single-frame wide dynamic range with checkerboard pattern, native wide dynamic range, or non-linear response.

18. An apparatus, comprising:
an architecture recognizer to determine an architecture type of an image sensor;
a function selector to select a subset of wide dynamic range processing blocks of an image signal processor to execute a wide dynamic range processing flow based on the architecture type of the image sensor;
a sensor adapter to configure the subset of the wide dynamic range processing blocks to generate a wide dynamic range image from input data from the image sensor; and
a controller, the sensor adapter to configure the controller to:
control execution one of the wide dynamic range processing blocks that is in the subset of the wide dynamic range processing blocks; and
bypass ones of the wide dynamic range processing blocks that are not in the subset of the wide dynamic range processing blocks to execute the wide dynamic range processing flow.

19. An apparatus as defined in claim 18, in which the architecture recognizer is to determine the architecture type of the image sensor by controlling the image sensor to capture image data and analyzing the image data to determine a wide dynamic range imaging technique corresponding to the image data.

20. An apparatus as defined in claim 18, in which the architecture recognizer is to determine the architecture type of the image sensor by accessing a storage device to obtain an encoded identifier representing at least one of the image sensor or the architecture type.

21. An apparatus as defined in claim 18, in which the sensor adapter is to configure the subset of the wide dynamic range processing blocks by selecting the wide dynamic range processing flow to include multiple sub-operations when one of the wide dynamic range processing blocks in the subset is to be executed more than once.

22. An apparatus as defined in claim 21, including a controller, the sensor adapter to configure the controller to control transfer of data between the wide dynamic range processing blocks in the subset according to the wide dynamic range processing flow.

23. An apparatus as defined in claim 21, including a controller, the sensor adapter to configure the controller to control execution of the subset of the wide dynamic range processing blocks according to the wide dynamic range processing flow.

24. An apparatus as defined in claim 18, including:
an interpolator to perform pixel interpolation to determine pixel data for first pixels located between second pixels captured by an image sensor;
a linearizer to perform linear mapping to transform a lower bit-rate image to a higher bit-depth image;
a pre-processor to perform at least one of noise filtering, pixel correction, or lens shading;
a phase shifter to selectively shift a phase of interleaved pixel data to deinterleave the interleaved pixel data;
a merger to select portions of multiple frames to be merged into wide dynamic range images; and
a tone mapper to reduce a bit-depth of higher bit-depth wide dynamic range images to generate lower bit-depth wide dynamic range images, the function selector to select the subset of the wide dynamic range processing blocks to include at least one of the interpolator, the linearizer, the phase shifter, the merger, or the tone mapper.

25. An apparatus as defined in claim 24, in which the at least one of the interpolator, the linearizer, the phase shifter, the merger, or the tone mapper in the subset of the wide dynamic range processing blocks includes an electronic circuit.

26. An image signal processor, comprising:
a wide dynamic range processor having a set of wide dynamic range processing blocks, the wide dynamic range processing blocks including:
an interpolator to perform pixel interpolation to determine pixel data for first pixels located between second pixels captured by an image sensor;
a linearizer to perform linear mapping to transform a lower bit-rate image from the image sensor to a higher bit-depth image;
a phase shifter to selectively shift a phase of interleaved pixel data to deinterleave the interleaved pixel data;
a pre-processor to perform at least one of noise filtering, pixel correction, or lens shading on at least one of the first pixels from the interpolator, the higher bit-depth image from the linearizer, or deinterleaved data from the phase shifter;
a merger to select portions of multiple frames to be merged into wide dynamic range images, the merger to obtain the frames from at least one of the pre-processor, the interpolator, or the phase shifter; and
a tone mapper to reduce a bit-depth of higher bit-depth wide dynamic range images to generate lower bit-depth wide dynamic range images, the tone mapper to obtain the higher bit-depth wide dynamic range images from at least one of the merger, the pre-processor, the linearizer, or the image sensor;
a controller to control the set of wide dynamic range processing blocks to process image data and to store image data in a memory;
an architecture recognizer to determine an architecture type of the image sensor;
a function selector to convert the architecture type to a wide dynamic range processing flow, the wide dynamic range processing flow including a subset of the wide dynamic range processing blocks; and
a sensor adapter to configure the subset of the wide dynamic range processing blocks to generate a wide dynamic range image from input data from the image sensor and to configure the controller to execute the subset of the wide dynamic range processing blocks.

* * * * *